United States Patent
Cull et al.

(10) Patent No.: US 6,795,751 B2
(45) Date of Patent: Sep. 21, 2004

(54) SYSTEM AND METHOD TO ACCOMPLISH HIGH-ACCURACY MIXING

(75) Inventors: Brian D. Cull, Glendale, AZ (US); Elias D. Haim, Glendale, AZ (US)

(73) Assignee: Honeywell International Inc., Morristown, NJ (US)

(*) Notice: Subject to any disclaimer, the term of this patent is extended or adjusted under 35 U.S.C. 154(b) by 418 days.

(21) Appl. No.: 09/982,486

(22) Filed: Oct. 17, 2001

(65) Prior Publication Data

US 2002/0079479 A1 Jun. 27, 2002

Related U.S. Application Data

(60) Provisional application No. 60/251,673, filed on Dec. 6, 2000.

(51) Int. Cl.$^7$ .............................................. G05B 21/00
(52) U.S. Cl. ........................ 700/265; 313/487; 700/117
(58) Field of Search .......................... 700/97, 117, 265, 700/266; 252/301.36; 313/468, 486, 487; 345/102; 356/403, 405, 408, 425, 402; 250/226; 257/E33.061; 702/32; 366/132, 142, 152.1; 703/6; 382/165

(56) References Cited

U.S. PATENT DOCUMENTS

| | | | | |
|---|---|---|---|---|
| 4,403,866 A | * | 9/1983 | Falcoff et al. | 366/132 |
| 4,887,217 A | * | 12/1989 | Sherman et al. | 700/117 |
| 4,977,522 A | | 12/1990 | David | |
| 5,854,533 A | * | 12/1998 | Pappalardo | 313/487 |
| 5,907,495 A | | 5/1999 | Snyder | |
| 6,052,195 A | | 4/2000 | Mestha | |
| 6,243,068 B1 | * | 6/2001 | Evanicky et al. | 345/102 |
| 6,567,751 B1 | * | 5/2003 | Sun | 702/32 |
| 6,608,614 B1 | * | 8/2003 | Johnson | 345/102 |

FOREIGN PATENT DOCUMENTS

EP            0484564 A        5/1992

* cited by examiner

*Primary Examiner*—Leo Picard
*Assistant Examiner*—Steven R. Garland

(57) ABSTRACT

A system and method is disclosed for determining the proper mixture of substances (e.g. phosphors) or sources (e.g. of light) to obtain a required or desired property, such as color or chromaticity. Steps may include mixing the substances or sources, preparing a prototype, measuring the property (such as chromaticity) of the prototype, and calculating any required adjustment in the quantities of substances or sources. This process may be repeated until the desired property is achieved, after which the mix of substances or sources may be used to manufacture products. A computer spreadsheet is also disclosed, as an exemplary embodiment, which calculates any required adjustments in the quantities of substances or sources. The spreadsheet provided is specifically configured to calculate adjustments in phosphor quantities required for manufacturing lamps for backlighting in AMLCD avionics applications.

34 Claims, 42 Drawing Sheets

| | A | B | C | D | E | F | G | H |
|---|---|---|---|---|---|---|---|---|
| 1 | | | | Copyright 2000 Honeywell International Inc. | | | | |
| 2 | Phosphor | Formulation | Previous Formulation | Adjustment Needed | Formulation Percent | Enter Starting Formulation | Preliminary Calculation | |
| 3 | Color | Grams | Grams | Grams | | | | |
| 4 | | | | | | | | |
| 5 | Red | 4207.71 g | 4207.71 g | 0.00 g | 46.24% | 4000.00 g | 4207.71 g | 4207.71 |
| 6 | Green | 2613.50 g | 2613.50 g | 0.00 g | 28.72% | 2600.00 g | 2613.50 g | 2613.50 |
| 7 | Blue | 2278.79 g | 2278.79 g | 0.00 g | 25.04% | 2500.00 g | 2278.79 g | 2278.79 |
| 8 | Total | 9100.00 g | | | 100.00% | 9100.00 g | 9100.00 g | 9100.00 |
| 9 | | | | | | | | |
| 10 | | | u' | v' | L (fL) | | | |
| 11 | Calc Lamp ——> | | 0.227 | 0.458 | 4458 | | | |
| 12 | Lamp Measurement | | 0.227 | 0.458 | | | | |
| 13 | Desired Chromaticity | | 0.228 | 0.455 | | | | |

FIG. 3

| A | B | C | D | E | F | G |
|---|---|---|---|---|---|---|
| Lamp Color Calculation | | | Red Green Blue Phosphor | | | |
| | | | | 7.1W | 7.25W | 7.0W |
| Red | Green | Blue | Wavelength | Red | Green | Blue |
| 0.0013 | 0.0000 | 0.0063 | 400 | 6.27E-02 | 1.01E-01 | 1.36E-01 |
| 0.0025 | 0.0001 | 0.0119 | 402 | 1.03E-01 | 1.61E-01 | 2.12E-01 |
| 0.0034 | 0.0001 | 0.0163 | 404 | 1.14E-01 | 1.81E-01 | 2.42E-01 |
| 0.0039 | 0.0001 | 0.0186 | 406 | 9.82E-02 | 1.55E-01 | 2.36E-01 |
| 0.0035 | 0.0001 | 0.0169 | 408 | 6.14E-02 | 9.43E-02 | 1.97E-01 |
| 0.0026 | 0.0001 | 0.0124 | 410 | 2.24E-02 | 3.54E-02 | 1.58E-01 |
| 0.0028 | 0.0001 | 0.0131 | 412 | 9.45E-03 | 1.93E-02 | 1.61E-01 |
| 0.0039 | 0.0001 | 0.0185 | 414 | 9.37E-03 | 1.57E-02 | 1.88E-01 |
| 0.0058 | 0.0002 | 0.0275 | 416 | 1.01E-02 | 1.63E-02 | 2.27E-01 |
| 0.0085 | 0.0002 | 0.0406 | 418 | 1.24E-02 | 1.64E-02 | 2.70E-01 |
| 0.0125 | 0.0004 | 0.0600 | 420 | 1.51E-02 | 1.94E-02 | 3.21E-01 |
| 0.0180 | 0.0006 | 0.0868 | 422 | 1.71E-02 | 2.21E-02 | 3.78E-01 |
| 0.0259 | 0.0009 | 0.1252 | 424 | 2.16E-02 | 2.94E-02 | 4.47E-01 |
| 0.0358 | 0.0013 | 0.1733 | 426 | 2.80E-02 | 3.87E-02 | 5.24E-01 |
| 0.0493 | 0.0019 | 0.2399 | 428 | 4.31E-02 | 5.99E-02 | 6.13E-01 |
| 0.0767 | 0.0031 | 0.3745 | 430 | 9.49E-02 | 1.33E-01 | 7.52E-01 |
| 0.1411 | 0.0063 | 0.6919 | 432 | 2.35E-01 | 3.38E-01 | -1.03E+00 |
| 0.1842 | 0.0090 | 0.9076 | 434 | 3.09E-01 | 4.50E-01 | 1.20E+00 |
| 0.1855 | 0.0100 | 0.9191 | 436 | 2.86E-01 | 4.14E-01 | 1.21E+00 |
| 0.1590 | 0.0095 | 0.7922 | 438 | 2.04E-01 | 2.95E-01 | 1.14E+00 |
| 0.0997 | 0.0066 | 0.5003 | 440 | 5.66E-02 | 8.29E-02 | 9.44E-01 |
| 0.0808 | 0.0059 | 0.4086 | 442 | 6.38E-03 | 8.46E-03 | 9.01E-01 |

FIG. 6

| | A | B | C | D | E | F | G |
|---|---|---|---|---|---|---|---|
| 62 | 0.0831 | 0.0067 | 0.4236 | 444 | 4.79E-03 | 5.19E-03 | 9.35E-01 |
| 63 | 0.0857 | 0.0077 | 0.4410 | 446 | 4.82E-03 | 5.27E-03 | 9.73E-01 |
| 64 | 0.0868 | 0.0088 | 0.4517 | 448 | 3.53E-03 | 5.50E-03 | 1.00E+00 |
| 65 | 0.0874 | 0.0099 | 0.4607 | 450 | 3.95E-03 | 5.92E-03 | 1.02E+00 |
| 66 | 0.0877 | 0.0111 | 0.4690 | 452 | 4.40E-03 | 5.76E-03 | 1.05E+00 |
| 67 | 0.0860 | 0.0122 | 0.4668 | 454 | 4.43E-03 | 4.86E-03 | 1.05E+00 |
| 68 | 0.0830 | 0.0133 | 0.4579 | 456 | 4.45E-03 | 4.07E-03 | 1.04E+00 |
| 69 | 0.0776 | 0.0141 | 0.4365 | 458 | 4.06E-03 | 5.38E-03 | 1.01E+00 |
| 70 | 0.0719 | 0.0148 | 0.4130 | 460 | 4.93E-03 | 5.24E-03 | 9.73E-01 |
| 71 | 0.0656 | 0.0155 | 0.3846 | 462 | 5.73E-03 | 6.80E-03 | 9.28E-01 |
| 72 | 0.0590 | 0.0161 | 0.3546 | 464 | 7.87E-03 | 5.12E-03 | 8.85E-01 |
| 73 | 0.0519 | 0.0166 | 0.3201 | 466 | 7.23E-03 | 5.86E-03 | 8.40E-01 |
| 74 | 0.0448 | 0.0172 | 0.2851 | 468 | 6.67E-03 | 6.80E-03 | 7.99E-01 |
| 75 | 0.0386 | 0.0180 | 0.2543 | 470 | 6.46E-03 | 9.84E-03 | 7.65E-01 |
| 76 | 0.0330 | 0.0189 | 0.2264 | 472 | 5.54E-03 | 1.48E-02 | 7.34E-01 |
| 77 | 0.0281 | 0.0199 | 0.2013 | 474 | 4.94E-03 | 2.24E-02 | 7.03E-01 |
| 78 | 0.0238 | 0.0212 | 0.1791 | 476 | 5.07E-03 | 4.18E-02 | 6.62E-01 |
| 79 | 0.0207 | 0.0234 | 0.1651 | 478 | 3.74E-03 | 8.21E-02 | 6.30E-01 |
| 80 | 0.0190 | 0.0276 | 0.1615 | 480 | 3.71E-03 | 1.69E-01 | 5.93E-01 |
| 81 | 0.0182 | 0.0345 | 0.1672 | 482 | 4.70E-03 | 3.08E-01 | 5.54E-01 |
| 82 | 0.0170 | 0.0427 | 0.1712 | 484 | 5.91E-03 | 4.60E-01 | 5.10E-01 |
| 83 | 0.0142 | 0.0484 | 0.1598 | 486 | 6.24E-03 | 5.41E-01 | 4.65E-01 |
| 84 | 0.0107 | 0.0499 | 0.1356 | 488 | 6.98E-03 | 5.26E-01 | 4.25E-01 |
| 85 | 0.0073 | 0.0474 | 0.1060 | 490 | 6.63E-03 | 4.45E-01 | 3.88E-01 |
| 86 | 0.0046 | 0.0435 | 0.0844 | 492 | 5.99E-03 | 3.50E-01 | 3.54E-01 |
| 87 | 0.0028 | 0.0391 | 0.0589 | 494 | 5.08E-03 | 2.64E-01 | 3.19E-01 |
| 88 | 0.0016 | 0.0353 | 0.0437 | 496 | 6.47E-03 | 1.93E-01 | 2.88E-01 |

FIG. 7

| | A | B | C | D | E | F | G |
|---|---|---|---|---|---|---|---|
| 89 | 0.0009 | 0.0321 | 0.0327 | 498 | 5.41E-03 | 1.39E-01 | 2.64E-0 |
| 90 | 0.0004 | 0.0294 | 0.0248 | 500 | 4.89E-03 | 9.73E-02 | 2.43E-01 |
| 91 | 0.0002 | 0.0270 | 0.0187 | 502 | 3.19E-03 | 6.52E-02 | 2.23E-01 |
| 92 | 0.0001 | 0.0254 | 0.0146 | 504 | 3.86E-03 | 4.32E-02 | 2.03E-01 |
| 93 | 0.0002 | 0.0240 | 0.0113 | 506 | 3.13E-03 | 2.71E-02 | 1.88E-01 |
| 94 | 0.0003 | 0.0236 | 0.0091 | 508 | 4.33E-03 | 1.89E-02 | 1.74E-01 |
| 95 | 0.0004 | 0.0235 | 0.0074 | 510 | 5.23E-03 | 1.38E-02 | 1.61E-01 |
| 96 | 0.0004 | 0.0240 | 0.0061 | 512 | 5.65E-03 | 1.45E-02 | 1.49E-01 |
| 97 | 0.0007 | 0.0230 | 0.0047 | 514 | 5.56E-03 | 1.06E-02 | 1.34E-01 |
| 98 | 0.0009 | 0.0224 | 0.0037 | 516 | 4.24E-03 | 1.03E-02 | 1.23E-01 |
| 99 | 0.0014 | 0.0214 | 0.0029 | 518 | 3.25E-03 | 9.09E-03 | 1.11E-01 |
| 100 | 0.0015 | 0.0208 | 0.0023 | 520 | 2.77E-03 | 9.79E-03 | 1.01E-01 |
| 101 | 0.0019 | 0.0202 | 0.0019 | 522 | 3.73E-03 | 9.44E-03 | 9.02E-02 |
| 102 | 0.0022 | 0.0200 | 0.0016 | 524 | 3.92E-03 | 1.24E-02 | 8.14E-02 |
| 103 | 0.0026 | 0.0204 | 0.0014 | 526 | 4.87E-03 | 1.62E-02 | 7.34E-02 |
| 104 | 0.0030 | 0.0232 | 0.0013 | 528 | 1.02E-02 | 2.20E-02 | 6.66E-02 |
| 105 | 0.0039 | 0.0289 | 0.0014 | 530 | 1.83E-02 | 3.45E-02 | 6.08E-02 |
| 106 | 0.0056 | 0.0410 | 0.0017 | 532 | 2.44E-02 | 7.32E-02 | 5.59E-02 |
| 107 | 0.0088 | 0.0739 | 0.0026 | 534 | 2.95E-02 | 1.92E-01 | 5.17E-02 |
| 108 | 0.0174 | 0.1846 | 0.0055 | 536 | 2.79E-02 | 6.09E-01 | 4.85E-02 |
| 109 | 0.0476 | 0.3734 | 0.0094 | 538 | 2.58E-02 | 1.30E+00 | 5.11E-02 |
| 110 | 0.1049 | 0.6001 | 0.0128 | 540 | 6.31E-02 | 1.99E+00 | 1.13E-01 |
| 111 | 0.1827 | 0.8525 | 0.0152 | 542 | 1.58E-01 | 2.58E+00 | 2.71E-01 |
| 112 | 0.2803 | 0.9467 | 0.0141 | 544 | 2.12E-01 | 2.72E+00 | 3.63E-01 |
| 113 | 0.3351 | 0.8339 | 0.0104 | 546 | 2.14E-01 | 2.29E+00 | 3.68E-01 |
| 114 | 0.2550 | 0.6260 | 0.0066 | 548 | 1.60E-01 | 1.71E+00 | 2.72E-01 |

FIG. 8

| | A | B | C | D | E | F | G |
|---|---|---|---|---|---|---|---|
| 115 | 0.1543 | 0.3542 | 0.0031 | 550 | 6.08E-02 | 1.06E+00 | 9.93E-02 |
| 116 | 0.0901 | 0.1936 | 0.0014 | 552 | 2.64E-02 | 5.99E-01 | 3.91E-02 |
| 117 | 0.0556 | 0.1120 | 0.0007 | 554 | 1.84E-02 | 3.35E-01 | 2.96E-02 |
| 118 | 0.0343 | 0.0649 | 0.0003 | 556 | 1.17E-02 | 1.86E-01 | 2.43E-02 |
| 119 | 0.0226 | 0.0403 | 0.0002 | 558 | 9.45E-03 | 1.06E-01 | 2.16E-02 |
| 120 | 0.0186 | 0.0311 | 0.0001 | 560 | 1.13E-02 | 7.38E-02 | 1.92E-02 |
| 121 | 0.0161 | 0.0253 | 0.0001 | 562 | 1.28E-02 | 5.29E-02 | 1.78E-02 |
| 122 | 0.0151 | 0.0224 | 0.0001 | 564 | 1.53E-02 | 4.03E-02 | 1.67E-02 |
| 123 | 0.0138 | 0.0193 | 0.0001 | 566 | 1.49E-02 | 3.17E-02 | 1.54E-02 |
| 124 | 0.0126 | 0.0167 | 0.0000 | 568 | 1.30E-02 | 2.60E-02 | 1.52E-02 |
| 125 | 0.0142 | 0.0177 | 0.0000 | 570 | 1.40E-02 | 2.69E-02 | 1.78E-02 |
| 126 | 0.0334 | 0.0395 | 0.0001 | 572 | 2.99E-02 | 6.13E-02 | 4.25E-02 |
| 127 | 0.0726 | 0.0810 | 0.0002 | 574 | 6.42E-02 | 1.26E-01 | 8.73E-02 |
| 128 | 0.1153 | 0.1219 | 0.0002 | 576 | 1.08E-01 | 1.92E-01 | 1.18E-01 |
| 129 | 0.1522 | 0.1524 | 0.0003 | 578 | 1.40E-01 | 2.67E-01 | 1.20E-01 |
| 130 | 0.1704 | 0.1618 | 0.0003 | 580 | 1.42E-01 | 3.43E-01 | 8.80E-02 |
| 131 | 0.1813 | 0.1634 | 0.0003 | 582 | 1.50E-01 | 3.93E-01 | 4.13E-02 |
| 132 | 0.1939 | 0.1659 | 0.0003 | 584 | 1.73E-01 | 4.03E-01 | 1.91E-02 |
| 133 | 0.1950 | 0.1586 | 0.0003 | 586 | 1.88E-01 | 3.71E-01 | 1.39E-02 |
| 134 | 0.1965 | 0.1521 | 0.0002 | 588 | 2.28E-01 | 3.01E-01 | 1.17E-02 |
| 135 | 0.1896 | 0.1398 | 0.0002 | 590 | 2.50E-01 | 2.32E-01 | 1.05E-02 |
| 136 | 0.1729 | 0.1217 | 0.0002 | 592 | 2.46E-01 | 1.75E-01 | 9.05E-03 |
| 137 | 0.1642 | 0.1104 | 0.0002 | 594 | 2.59E-01 | 1.20E-01 | 8.60E-03 |
| 138 | 0.1497 | 0.0964 | 0.0001 | 596 | 2.48E-01 | 8.60E-02 | 7.66E-03 |
| 139 | 0.1290 | 0.0797 | 0.0001 | 598 | 2.21E-01 | 6.06E-02 | 7.18E-03 |
| 140 | 0.1162 | 0.0691 | 0.0001 | 600 | 2.06E-01 | 4.35E-02 | 6.58E-03 |
| 141 | 0.1023 | 0.0585 | 0.0001 | 602 | 1.88E-01 | 2.93E-02 | 6.31E-03 |

FIG. 9

| | A | B | C | D | E | F | G |
|---|---|---|---|---|---|---|---|
| 142 | 0.1283 | 0.0707 | 0.0001 | 604 | 2.46E-01 | 2.33E-02 | 6.57E-03 |
| 143 | 0.4072 | 0.2170 | 0.0002 | 606 | 8.29E-01 | 2.25E-02 | 8.43E-03 |
| 144 | 0.7810 | 0.4035 | 0.0003 | 608 | 1.63E+00 | 2.77E-02 | 1.00E-02 |
| 145 | 0.9768 | 0.4900 | 0.0003 | 610 | 2.08E+00 | 3.95E-02 | 1.20E-02 |
| 146 | 0.9589 | 0.4680 | 0.0003 | 612 | 2.07E+00 | 6.47E-02 | 1.16E-02 |
| 147 | 0.6911 | 0.3289 | 0.0002 | 614 | 1.50E+00 | 1.03E-01 | 9.20E-03 |
| 148 | 0.3923 | 0.1823 | 0.0001 | 616 | 8.20E-01 | 1.53E-01 | 7.43E-03 |
| 149 | 0.2311 | 0.1051 | 0.0001 | 618 | 4.27E-01 | 2.11E-01 | 6.19E-03 |
| 150 | 0.1711 | 0.0763 | 0.0000 | 620 | 2.71E-01 | 2.56E-01 | 5.48E-03 |
| 151 | 0.1556 | 0.0681 | 0.0000 | 622 | 2.39E-01 | 2.76E-01 | 5.60E-03 |
| 152 | 0.1475 | 0.0635 | 0.0000 | 624 | 2.53E-01 | 2.53E-01 | 5.05E-03 |
| 153 | 0.1477 | 0.0626 | 0.0000 | 626 | 3.09E-01 | 2.03E-01 | 4.70E-03 |
| 154 | 0.1398 | 0.0585 | 0.0000 | 628 | 3.52E-01 | 1.40E-01 | 4.20E-03 |
| 155 | 0.1169 | 0.0482 | 0.0000 | 630 | 3.39E-01 | 8.49E-02 | 4.08E-03 |
| 156 | 0.0858 | 0.0349 | 0.0000 | 632 | 2.76E-01 | 4.92E-02 | 4.03E-03 |
| 157 | 0.0496 | 0.0200 | 0.0000 | 634 | 1.67E-01 | 3.68E-02 | 3.33E-03 |
| 158 | 0.0278 | 0.0111 | 0.0000 | 636 | 9.57E-02 | 2.87E-02 | 2.82E-03 |
| 159 | 0.0197 | 0.0078 | 0.0000 | 638 | 7.03E-02 | 2.54E-02 | 3.05E-03 |
| 160 | 0.0164 | 0.0064 | 0.0000 | 640 | 5.98E-02 | 2.86E-02 | 3.13E-03 |
| 161 | 0.0137 | 0.0053 | 0.0000 | 642 | 5.16E-02 | 3.01E-02 | 2.79E-03 |
| 162 | 0.0126 | 0.0048 | 0.0000 | 644 | 4.94E-02 | 3.44E-02 | 2.43E-03 |
| 163 | 0.0150 | 0.0057 | 0.0000 | 646 | 6.67E-02 | 4.19E-02 | 3.17E-03 |
| 164 | 0.0165 | 0.0063 | 0.0000 | 648 | 8.41E-02 | 4.54E-02 | 3.31E-03 |
| 165 | 0.0163 | 0.0061 | 0.0000 | 650 | 9.10E-02 | 5.06E-02 | 3.01E-03 |
| 166 | 0.0140 | 0.0052 | 0.0000 | 652 | 8.47E-02 | 5.11E-02 | 2.50E-03 |
| 167 | 0.0104 | 0.0039 | 0.0000 | 654 | 6.50E-02 | 5.03E-02 | 2.59E-03 |
| 168 | 0.0080 | 0.0030 | 0.0000 | 656 | 5.08E-02 | 5.03E-02 | 1.92E-03 |

FIG. 10

| | A | B | C | D | E | F | G |
|---|---|---|---|---|---|---|---|
| 169 | 0.0070 | 0.0026 | 0.0000 | 658 | 5.19E-02 | 4.68E-02 | 2.13E-03 |
| 170 | 0.0063 | 0.0023 | 0.0000 | 660 | 5.69E-02 | 4.00E-02 | 1.86E-03 |
| 171 | 0.0055 | 0.0020 | 0.0000 | 662 | 5.61E-02 | 3.80E-02 | 1.81E-03 |
| 172 | 0.0043 | 0.0016 | 0.0000 | 664 | 4.77E-02 | 3.79E-02 | 1.93E-03 |
| 173 | 0.0031 | 0.0012 | 0.0000 | 666 | 3.47E-02 | 3.86E-02 | 2.12E-03 |
| 174 | 0.0024 | 0.0009 | 0.0000 | 668 | 2.52E-02 | 4.14E-02 | 1.62E-03 |
| 175 | 0.0019 | 0.0007 | 0.0000 | 670 | 2.04E-02 | 4.07E-02 | 1.39E-03 |
| 176 | 0.0015 | 0.0005 | 0.0000 | 672 | 1.80E-02 | 3.64E-02 | 1.05E-03 |
| 177 | 0.0012 | 0.0004 | 0.0000 | 674 | 1.55E-02 | 3.52E-02 | 2.16E-03 |
| 178 | 0.0011 | 0.0004 | 0.0000 | 676 | 1.41E-02 | 3.76E-02 | 1.43E-03 |
| 179 | 0.0010 | 0.0004 | 0.0000 | 678 | 1.27E-02 | 4.31E-02 | 1.44E-03 |
| 180 | 0.0009 | 0.0003 | 0.0000 | 680 | 1.61E-02 | 4.27E-02 | 1.10E-03 |
| 181 | 0.0010 | 0.0004 | 0.0000 | 682 | 2.55E-02 | 4.08E-02 | 9.77E-04 |
| 182 | 0.0011 | 0.0004 | 0.0000 | 684 | 4.16E-02 | 3.61E-02 | 1.20E-03 |
| 183 | 0.0010 | 0.0004 | 0.0000 | 686 | 5.38E-02 | 2.82E-02 | 2.15E-03 |
| 184 | 0.0009 | 0.0003 | 0.0000 | 688 | 5.65E-02 | 2.27E-02 | 3.51E-03 |
| 185 | 0.0007 | 0.0003 | 0.0000 | 690 | 5.78E-02 | 1.49E-02 | 3.40E-03 |
| 186 | 0.0007 | 0.0002 | 0.0000 | 692 | 5.94E-02 | 1.73E-02 | 5.46E-03 |
| 187 | 0.0006 | 0.0002 | 0.0000 | 694 | 6.20E-02 | 1.99E-02 | 7.41E-03 |
| 188 | 0.0005 | 0.0002 | 0.0000 | 696 | 5.33E-02 | 1.78E-02 | 7.64E-03 |
| 189 | 0.0003 | 0.0001 | 0.0000 | 698 | 4.28E-02 | 1.53E-02 | 7.18E-03 |
| 190 | 0.0003 | 0.0001 | 0.0000 | 700 | 4.74E-02 | 1.11E-02 | 5.15E-03 |

FIG. 11

|     |     | A | B | C |
|-----|-----|---------|---------|---------|
| 192 |     | 24.9363 | 22.3609 | 26.3521 |
| 193 |     |         |         |         |
| 194 | Red |         |         |         |
| 195 | X   |         | 24.9363 |         |
| 196 | Y   |         | 22.3609 |         |
| 197 | Z   |         | 26.3521 |         |
| 198 |     |         |         |         |
| 199 | x   |         | 0.3386  |         |
| 200 | y   |         | 0.3036  |         |
| 201 |     |         |         |         |
| 202 | u'  |         | 0.2270  |         |
| 203 | v'  |         | 0.4580  |         |
| 204 |     |         |         |         |
| 205 | L   |         | 4458.05 |         |

FIG. 12

| | H | I | J | K | L | M | N | O | P |
|---|---|---|---|---|---|---|---|---|---|
| 36 | Spectral Emissions of Mixture | | | | Spectral Emissions for Graph | | | | |
| 37 | | | | | Normalized | | | | |
| 38 | | | | | Wavelength | | | | |
| 39 | Red | Green | Blue | White | | | | | |
| 40 | 0.0289685 | 0.02912185 | 0.034157 | 0.0922 | 400 | 0.0296 | 0.02974 | 0.0349 | 0.0942 |
| 41 | 0.047487 | 0.046296274 | 0.053038 | 0.1468 | 402 | 0.0485 | 0.04728 | 0.0542 | 0.15 |
| 42 | 0.0528044 | 0.051839191 | 0.060551 | 0.1652 | 404 | 0.0539 | 0.05295 | 0.0618 | 0.1687 |
| 43 | 0.0454063 | 0.044515649 | 0.059148 | 0.1491 | 406 | 0.0464 | 0.04547 | 0.0604 | 0.1523 |
| 44 | 0.0283766 | 0.027068386 | 0.049257 | 0.1047 | 408 | 0.029 | 0.02765 | 0.0503 | 0.1069 |
| 45 | 0.0103482 | 0.0101668 | 0.039466 | 0.0600 | 410 | 0.0106 | 0.01038 | 0.0403 | 0.0613 |
| 46 | 0.0043672 | 0.005540044 | 0.040242 | 0.0501 | 412 | 0.0045 | 0.00566 | 0.0411 | 0.0512 |
| 47 | 0.004333 | 0.004497516 | 0.047003 | 0.0558 | 414 | 0.0044 | 0.00459 | 0.048 | 0.057 |
| 48 | 0.004684 | 0.004672707 | 0.05682 | 0.0662 | 416 | 0.0048 | 0.00477 | 0.058 | 0.0676 |
| 49 | 0.0057521 | 0.004712915 | 0.067713 | 0.0782 | 418 | 0.0059 | 0.00481 | 0.0692 | 0.0798 |
| 50 | 0.0069635 | 0.005557276 | 0.080459 | 0.0930 | 420 | 0.0071 | 0.00568 | 0.0822 | 0.095 |
| 51 | 0.0079207 | 0.006352814 | 0.094683 | 0.1090 | 422 | 0.0081 | 0.00649 | 0.0967 | 0.1113 |
| 52 | 0.0099783 | 0.008446485 | 0.112036 | 0.1305 | 424 | 0.0102 | 0.00863 | 0.1144 | 0.1332 |
| 53 | 0.0129329 | 0.011103064 | 0.131319 | 0.1554 | 426 | 0.0132 | 0.01134 | 0.1341 | 0.1587 |
| 54 | 0.0199381 | 0.017206016 | 0.153531 | 0.1907 | 428 | 0.0204 | 0.01757 | 0.1568 | 0.1947 |
| 55 | 0.043885 | 0.038111139 | 0.188313 | 0.2703 | 430 | 0.0448 | 0.03893 | 0.1923 | 0.2761 |
| 56 | 0.1085219 | 0.096929235 | 0.257428 | 0.4629 | 432 | 0.1108 | 0.099 | 0.2629 | 0.4728 |
| 57 | 0.1430621 | 0.129124101 | 0.3005 | 0.5727 | 434 | 0.1461 | 0.13188 | 0.3069 | 0.5849 |
| 58 | 0.132196 | 0.118899861 | 0.303756 | 0.5549 | 436 | 0.135 | 0.12144 | 0.3102 | 0.5667 |
| 59 | 0.0945116 | 0.084579732 | 0.284223 | 0.4633 | 438 | 0.0965 | 0.08639 | 0.2903 | 0.4732 |
| 60 | 0.0261618 | 0.023817308 | 0.236368 | 0.2863 | 440 | 0.0267 | 0.02433 | 0.2414 | 0.2925 |
| 61 | 0.0029486 | 0.002428257 | 0.2255 | 0.2309 | 442 | 0.003 | 0.00248 | 0.2303 | 0.2358 |

FIG. 13

| | H | I | J | K | L | M | N | O | P |
|---|---|---|---|---|---|---|---|---|---|
| 62 | 0.0022167 | 0.001490269 | 0.234215 | 0.2379 | 444 | 0.0023 | 0.00152 | 0.2392 | 0.243 |
| 63 | 0.0022278 | 0.001514106 | 0.243605 | 0.2473 | 446 | 0.0023 | 0.00155 | 0.2488 | 0.2526 |
| 64 | 0.0016318 | 0.001580162 | 0.250667 | 0.2539 | 448 | 0.0017 | 0.00161 | 0.256 | 0.2593 |
| 65 | 0.0018283 | 0.001701072 | 0.256427 | 0.2600 | 450 | 0.0019 | 0.00174 | 0.2619 | 0.2655 |
| 66 | 0.0020354 | 0.001653397 | 0.262186 | 0.2659 | 452 | 0.0021 | 0.00169 | 0.2678 | 0.2716 |
| 67 | 0.0020498 | 0.001396355 | 0.262938 | 0.2664 | 454 | 0.0021 | 0.00143 | 0.2686 | 0.2721 |
| 68 | 0.0020585 | 0.001169469 | 0.260934 | 0.2642 | 456 | 0.0021 | 0.00119 | 0.2665 | 0.2698 |
| 69 | 0.0018787 | 0.001543975 | 0.25242 | 0.2558 | 458 | 0.0019 | 0.00158 | 0.2578 | 0.2613 |
| 70 | 0.0022786 | 0.001504916 | 0.24363 | 0.2474 | 460 | 0.0023 | 0.00154 | 0.2488 | 0.2527 |
| 71 | 0.0026495 | 0.001951509 | 0.232312 | 0.2369 | 462 | 0.0027 | 0.00199 | 0.2373 | 0.242 |
| 72 | 0.003639 | 0.001470452 | 0.221544 | 0.2267 | 464 | 0.0037 | 0.0015 | 0.2263 | 0.2315 |
| 73 | 0.0033444 | 0.001684128 | 0.21035 | 0.2154 | 466 | 0.0034 | 0.00172 | 0.2148 | 0.22 |
| 74 | 0.0030846 | 0.001954093 | 0.200108 | 0.2051 | 468 | 0.0032 | 0.002 | 0.2044 | 0.2095 |
| 75 | 0.0029889 | 0.002826887 | 0.191669 | 0.1975 | 470 | 0.0031 | 0.00289 | 0.1958 | 0.2017 |
| 76 | 0.0029616 | 0.004244782 | 0.183806 | 0.1906 | 472 | 0.0026 | 0.00434 | 0.1877 | 0.1947 |
| 77 | 0.0025616 | 0.006430357 | 0.175943 | 0.1847 | 474 | 0.0023 | 0.00657 | 0.1797 | 0.1886 |
| 78 | 0.0022846 | 0.012004865 | 0.165801 | 0.1802 | 476 | 0.0024 | 0.01226 | 0.1693 | 0.184 |
| 79 | 0.0023452 | 0.02357319 | 0.157863 | 0.1832 | 478 | 0.0018 | 0.02408 | 0.1612 | 0.1871 |
| 80 | 0.0017279 | 0.048478977 | 0.148472 | 0.1987 | 480 | 0.0018 | 0.04951 | 0.1516 | 0.2029 |
| 81 | 0.0017164 | 0.088342023 | 0.138706 | 0.2292 | 482 | 0.0022 | 0.09023 | 0.1417 | 0.2341 |
| 82 | 0.0021718 | 0.131996078 | 0.127813 | 0.2625 | 484 | 0.0028 | 0.13482 | 0.1305 | 0.2681 |
| 83 | 0.0027313 | 0.155287814 | 0.116319 | 0.2745 | 486 | 0.0029 | 0.1586 | 0.1188 | 0.2804 |
| 84 | 0.0028867 | 0.151152167 | 0.106302 | 0.2607 | 488 | 0.0033 | 0.15438 | 0.1086 | 0.2662 |
| 85 | 0.0032261 | 0.127659392 | 0.097112 | 0.2278 | 490 | 0.0031 | 0.13039 | 0.0992 | 0.2327 |
| 86 | 0.003067 | 0.100490487 | 0.088622 | 0.1919 | 492 | 0.0028 | 0.10264 | 0.0905 | 0.196 |
| 87 | 0.0027692 | 0.075705322 | 0.079883 | 0.1579 | 494 | 0.0024 | 0.07732 | 0.0816 | 0.1613 |
| 88 | 0.0023498 | 0.055544041 | 0.07207 | 0.1306 | 496 | 0.0031 | 0.05673 | 0.0736 | 0.1334 |
| | 0.0029907 | | | | | | | |

FIG. 14

| | H | I | J | K | L | M | N | O | P |
|---|---|---|---|---|---|---|---|---|---|
| 89 | 0.0025006 | 0.040035364 | 0.06611 | 0.1086 | 498 | 0.0026 | 0.04089 | 0.0675 | 0.111 |
| 90 | 0.0022592 | 0.027932851 | 0.060826 | 0.0910 | 500 | 0.0023 | 0.02853 | 0.0621 | 0.093 |
| 91 | 0.001475 | 0.018719548 | 0.055818 | 0.0760 | 502 | 0.0015 | 0.01912 | 0.057 | 0.0776 |
| 92 | 0.0017834 | 0.012406942 | 0.050935 | 0.0651 | 504 | 0.0018 | 0.01267 | 0.052 | 0.0665 |
| 93 | 0.0014473 | 0.007783059 | 0.047078 | 0.0563 | 506 | 0.0015 | 0.00795 | 0.0481 | 0.0575 |
| 94 | 0.0020031 | 0.005433781 | 0.043598 | 0.0510 | 508 | 0.002 | 0.00555 | 0.0445 | 0.0521 |
| 95 | 0.0024174 | 0.003971945 | 0.040292 | 0.0467 | 510 | 0.0025 | 0.00406 | 0.0412 | 0.0477 |
| 96 | 0.0026106 | 0.004158623 | 0.037237 | 0.0440 | 512 | 0.0027 | 0.00425 | 0.038 | 0.0449 |
| 97 | 0.0025704 | 0.003029936 | 0.033606 | 0.0392 | 514 | 0.0026 | 0.00309 | 0.0343 | 0.04 |
| 98 | 0.0019587 | 0.002966753 | 0.030701 | 0.0356 | 516 | 0.002 | 0.00303 | 0.0314 | 0.0364 |
| 99 | 0.0015046 | 0.002611489 | 0.027771 | 0.0319 | 518 | 0.0015 | 0.00267 | 0.0284 | 0.0326 |
| 100 | 0.0012827 | 0.002810517 | 0.025167 | 0.0293 | 520 | 0.0013 | 0.00287 | 0.0257 | 0.0299 |
| 101 | 0.0017252 | 0.002709998 | 0.022595 | 0.0270 | 522 | 0.0018 | 0.00277 | 0.0231 | 0.0276 |
| 102 | 0.0018107 | 0.003564124 | 0.020371 | 0.0257 | 524 | 0.0018 | 0.00364 | 0.0208 | 0.0263 |
| 103 | 0.0022537 | 0.004658347 | 0.018381 | 0.0253 | 526 | 0.0023 | 0.00476 | 0.0188 | 0.0258 |
| 104 | 0.0047302 | 0.006326966 | 0.01668 | 0.0277 | 528 | 0.0048 | 0.00646 | 0.017 | 0.0283 |
| 105 | 0.0084432 | 0.009899706 | 0.01522 | 0.0336 | 530 | 0.0086 | 0.01011 | 0.0155 | 0.0343 |
| 106 | 0.0112776 | 0.021022874 | 0.013986 | 0.0463 | 532 | 0.0115 | 0.02147 | 0.0143 | 0.0473 |
| 107 | 0.013645 | 0.055055805 | 0.012957 | 0.0817 | 534 | 0.0139 | 0.05623 | 0.0132 | 0.0834 |
| 108 | 0.0129052 | 0.174475982 | 0.012148 | 0.1998 | 536 | 0.0132 | 0.17849 | 0.0124 | 0.2041 |
| 109 | 0.0119434 | 0.372495459 | 0.012801 | 0.3972 | 538 | 0.0122 | 0.38045 | 0.0131 | 0.4057 |
| 110 | 0.0291904 | 0.571523488 | 0.028297 | 0.6290 | 540 | 0.0298 | 0.58373 | 0.0289 | 0.6424 |
| 111 | 0.0729644 | 0.741831743 | 0.067738 | 0.8825 | 542 | 0.0745 | 0.75767 | 0.0692 | 0.9014 |
| 112 | 0.0979795 | 0.781177833 | 0.090826 | 0.9700 | 544 | 0.1001 | 0.79786 | 0.0928 | 0.9907 |
| 113 | 0.0990892 | 0.656246819 | 0.092053 | 0.8474 | 546 | 0.1012 | 0.67026 | 0.094 | 0.8655 |
| 114 | 0.0739354 | 0.49024653 | 0.067988 | 0.6322 | 548 | 0.0755 | 0.50072 | 0.0694 | 0.6457 |

FIG. 15

| | H | I | J | K | L | M | N | O | P |
|---|---|---|---|---|---|---|---|---|---|
| 115 | 0.0281177 | 0.302993608 | 0.024859 | 0.3560 | 550 | 0.0287 | 0.30946 | 0.0254 | 0.3636 |
| 116 | 0.0121931 | 0.171945283 | 0.009796 | 0.1939 | 552 | 0.0125 | 0.17562 | 0.01 | 0.1981 |
| 117 | 0.0084848 | 0.096153801 | 0.00742 | 0.1121 | 554 | 0.0087 | 0.09821 | 0.0076 | 0.1145 |
| 118 | 0.0054192 | 0.053418778 | 0.00609 | 0.0649 | 556 | 0.0055 | 0.05456 | 0.0062 | 0.0663 |
| 119 | 0.0043705 | 0.030557839 | 0.005404 | 0.0403 | 558 | 0.0045 | 0.03121 | 0.0055 | 0.0412 |
| 120 | 0.0052296 | 0.021186577 | 0.004813 | 0.0312 | 560 | 0.0053 | 0.02164 | 0.0049 | 0.0319 |
| 121 | 0.0059232 | 0.015195632 | 0.004465 | 0.0256 | 562 | 0.006 | 0.01552 | 0.0046 | 0.0261 |
| 122 | 0.0070791 | 0.011565453 | 0.004169 | 0.0228 | 564 | 0.0072 | 0.01181 | 0.0043 | 0.0233 |
| 123 | 0.006871 | 0.009104168 | 0.003851 | 0.0198 | 566 | 0.007 | 0.0093 | 0.0039 | 0.0203 |
| 124 | 0.0060156 | 0.007467141 | 0.003799 | 0.0173 | 568 | 0.0061 | 0.00763 | 0.0039 | 0.0177 |
| 125 | 0.0064641 | 0.007719875 | 0.004447 | 0.0186 | 570 | 0.0066 | 0.00788 | 0.0045 | 0.019 |
| 126 | 0.0138068 | 0.017590861 | 0.010653 | 0.0421 | 572 | 0.0141 | 0.01797 | 0.0109 | 0.0429 |
| 127 | 0.0297036 | 0.036186914 | 0.021866 | 0.0878 | 574 | 0.0303 | 0.03696 | 0.0223 | 0.0896 |
| 128 | 0.0497527 | 0.055228124 | 0.029449 | 0.1344 | 576 | 0.0508 | 0.05641 | 0.0301 | 0.1373 |
| 129 | 0.0648265 | 0.076595635 | 0.03 | 0.1714 | 578 | 0.0662 | 0.07823 | 0.0306 | 0.1751 |
| 130 | 0.0655663 | 0.098393943 | 0.022034 | 0.1860 | 580 | 0.067 | 0.1005 | 0.0225 | 0.19 |
| 131 | 0.0692191 | 0.11278255 | 0.010337 | 0.1923 | 582 | 0.0707 | 0.11519 | 0.0106 | 0.1964 |
| 132 | 0.0799927 | 0.115740686 | 0.004778 | 0.2005 | 584 | 0.0817 | 0.11821 | 0.0049 | 0.2048 |
| 133 | 0.087021 | 0.106579079 | 0.003481 | 0.1971 | 586 | 0.0889 | 0.10886 | 0.0036 | 0.2013 |
| 134 | 0.1052852 | 0.086532677 | 0.002922 | 0.1947 | 588 | 0.1075 | 0.08838 | 0.003 | 0.1989 |
| 135 | 0.1153652 | 0.066744753 | 0.002632 | 0.1847 | 590 | 0.1178 | 0.06817 | 0.0027 | 0.1887 |
| 136 | 0.1136081 | 0.050259603 | 0.002265 | 0.1661 | 592 | 0.116 | 0.05133 | 0.0023 | 0.1697 |
| 137 | 0.1195267 | 0.034320129 | 0.002153 | 0.1560 | 594 | 0.1221 | 0.03505 | 0.0022 | 0.1593 |
| 138 | 0.1146254 | 0.024704749 | 0.001917 | 0.1412 | 596 | 0.1171 | 0.02523 | 0.002 | 0.1443 |
| 139 | 0.1021872 | 0.017389823 | 0.001798 | 0.1214 | 598 | 0.1044 | 0.01776 | 0.0018 | 0.124 |
| 140 | 0.0952977 | 0.012490229 | 0.001646 | 0.1094 | 600 | 0.0973 | 0.01276 | 0.0017 | 0.1118 |
| 141 | 0.0866973 | 0.00840915 | 0.00158 | 0.0967 | 602 | 0.0885 | 0.00859 | 0.0016 | 0.0988 |

FIG. 16

| | H | I | J | K | L | M | N | O | P |
|---|---|---|---|---|---|---|---|---|---|
| 142 | 0.1137006 | 0.006697451 | 0.001645 | 0.1220 | 604 | 0.1161 | 0.00684 | 0.0017 | 0.1246 |
| 143 | 0.3832251 | 0.006467693 | 0.002111 | 0.3918 | 606 | 0.3914 | 0.00661 | 0.0022 | 0.4002 |
| 144 | 0.753226 | 0.007966865 | 0.002507 | 0.7637 | 608 | 0.7693 | 0.00814 | 0.0026 | 0.78 |
| 145 | 0.9599124 | 0.011329951 | 0.003008 | 0.9742 | 610 | 0.9804 | 0.01157 | 0.0031 | 0.9951 |
| 146 | 0.9576004 | 0.018587437 | 0.002902 | 0.9791 | 612 | 0.9781 | 0.01898 | 0.003 | 1 |
| 147 | 0.6935783 | 0.029437768 | 0.002305 | 0.7253 | 614 | 0.7084 | 0.03007 | 0.0024 | 0.7408 |
| 148 | 0.3790174 | 0.044056132 | 0.001859 | 0.4249 | 616 | 0.3871 | 0.045 | 0.0019 | 0.434 |
| 149 | 0.1975311 | 0.060483842 | 0.001551 | 0.2596 | 618 | 0.2017 | 0.06178 | 0.0016 | 0.2651 |
| 150 | 0.1252602 | 0.073580059 | 0.001371 | 0.2002 | 620 | 0.1279 | 0.07515 | 0.0014 | 0.2045 |
| 151 | 0.1103252 | 0.079237854 | 0.001401 | 0.1910 | 622 | 0.1127 | 0.08093 | 0.0014 | 0.195 |
| 152 | 0.1169835 | 0.072632307 | 0.001265 | 0.1909 | 624 | 0.1195 | 0.07418 | 0.0013 | 0.195 |
| 153 | 0.1430621 | 0.05827242 | 0.001178 | 0.2025 | 626 | 0.1461 | 0.05952 | 0.0012 | 0.2068 |
| 154 | 0.1628059 | 0.040092803 | 0.001051 | 0.2040 | 628 | 0.1663 | 0.04095 | 0.0011 | 0.2083 |
| 155 | 0.1565637 | 0.024391703 | 0.001021 | 0.1820 | 630 | 0.1599 | 0.02491 | 0.001 | 0.1859 |
| 156 | 0.1275722 | 0.014130128 | 0.00101 | 0.1427 | 632 | 0.1303 | 0.01443 | 0.001 | 0.1458 |
| 157 | 0.0770334 | 0.010568877 | 0.000833 | 0.0884 | 634 | 0.0787 | 0.01079 | 0.0009 | 0.0903 |
| 158 | 0.0442503 | 0.008251191 | 0.000707 | 0.0532 | 636 | 0.0452 | 0.00843 | 0.0007 | 0.0543 |
| 159 | 0.032515 | 0.007294822 | 0.000763 | 0.0406 | 638 | 0.0332 | 0.00745 | 0.0008 | 0.0414 |
| 160 | 0.0276599 | 0.008205239 | 0.000785 | 0.0366 | 640 | 0.0283 | 0.00838 | 0.0008 | 0.0374 |
| 161 | 0.0238406 | 0.008636036 | 0.000698 | 0.0332 | 642 | 0.0243 | 0.00882 | 0.0007 | 0.0339 |
| 162 | 0.0228372 | 0.009870986 | 0.000609 | 0.0333 | 644 | 0.0233 | 0.01008 | 0.0006 | 0.034 |
| 163 | 0.030818 | 0.012039329 | 0.000793 | 0.0437 | 646 | 0.0315 | 0.0123 | 0.0008 | 0.0446 |
| 164 | 0.0388912 | 0.013047393 | 0.000828 | 0.0528 | 648 | 0.0397 | 0.01333 | 0.0008 | 0.0539 |
| 165 | 0.0420632 | 0.014543693 | 0.000755 | 0.0574 | 650 | 0.043 | 0.01485 | 0.0008 | 0.0586 |
| 166 | 0.0391825 | 0.014664316 | 0.000626 | 0.0545 | 652 | 0.04 | 0.01498 | 0.0006 | 0.0556 |
| 167 | 0.0300689 | 0.014434558 | 0.000649 | 0.0452 | 654 | 0.0307 | 0.01474 | 0.0007 | 0.0461 |
| 168 | 0.0234753 | 0.014434558 | 0.000481 | 0.0384 | 656 | 0.024 | 0.01474 | 0.0005 | 0.0392 |

FIG. 17

| | H | I | J | K | L | M | N | O | P |
|---|---|---|---|---|---|---|---|---|---|
| 169 | 0.0240071 | 0.01343511 | 0.000533 | 0.0380 | 658 | 0.0245 | 0.01372 | 0.0005 | 0.0388 |
| 170 | 0.0263144 | 0.01147929 | 0.000465 | 0.0383 | 660 | 0.0269 | 0.01172 | 0.0005 | 0.0391 |
| 171 | 0.0259398 | 0.01091925 | 0.000454 | 0.0373 | 662 | 0.0265 | 0.01115 | 0.0005 | 0.0381 |
| 172 | 0.0220373 | 0.01087043 | 0.000482 | 0.0334 | 664 | 0.0225 | 0.0111 | 0.0005 | 0.0341 |
| 173 | 0.0160494 | 0.01107147 | 0.000531 | 0.0277 | 666 | 0.0164 | 0.01131 | 0.0005 | 0.0282 |
| 174 | 0.0116614 | 0.01188424 | 0.000404 | 0.0240 | 668 | 0.0119 | 0.01214 | 0.0004 | 0.0245 |
| 175 | 0.0094095 | 0.01170043 | 0.000347 | 0.0215 | 670 | 0.0096 | 0.01195 | 0.0004 | 0.0219 |
| 176 | 0.0083137 | 0.01044825 | 0.000264 | 0.0190 | 672 | 0.0085 | 0.01067 | 0.0003 | 0.0194 |
| 177 | 0.007167 | 0.01010648 | 0.00054 | 0.0178 | 674 | 0.0073 | 0.01032 | 0.0006 | 0.0182 |
| 178 | 0.0065381 | 0.01079863 | 0.000358 | 0.0177 | 676 | 0.0067 | 0.01103 | 0.0004 | 0.0181 |
| 179 | 0.0058584 | 0.01238971 | 0.00036 | 0.0186 | 678 | 0.006 | 0.01265 | 0.0004 | 0.019 |
| 180 | 0.0074444 | 0.01222518 | 0.000276 | 0.0200 | 680 | 0.0076 | 0.01251 | 0.0003 | 0.0204 |
| 181 | 0.0118093 | 0.01170618 | 0.000245 | 0.0238 | 682 | 0.0121 | 0.01196 | 0.0002 | 0.0243 |
| 182 | 0.0192491 | 0.01036783 | 0.000301 | 0.0299 | 684 | 0.0197 | 0.01059 | 0.0003 | 0.0306 |
| 183 | 0.0248948 | 0.00809036 | 0.000538 | 0.0335 | 686 | 0.0254 | 0.00826 | 0.0005 | 0.0342 |
| 184 | 0.0261202 | 0.00651364 | 0.000879 | 0.0335 | 688 | 0.0267 | 0.00665 | 0.0009 | 0.0342 |
| 185 | 0.026712 | 0.00427637 | 0.000852 | 0.0318 | 690 | 0.0273 | 0.00437 | 0.0009 | 0.0325 |
| 186 | 0.0274472 | 0.00496852 | 0.001368 | 0.0338 | 692 | 0.028 | 0.00507 | 0.0014 | 0.0345 |
| 187 | 0.0286448 | 0.00572097 | 0.001855 | 0.0362 | 694 | 0.0293 | 0.00584 | 0.0019 | 0.037 |
| 188 | 0.0246313 | 0.00510637 | 0.001914 | 0.0317 | 696 | 0.0252 | 0.00522 | 0.002 | 0.0323 |
| 189 | 0.0197947 | 0.00439412 | 0.001797 | 0.0260 | 698 | 0.0202 | 0.00449 | 0.0018 | 0.0265 |
| 190 | 0.0219032 | 0.00319076 | 0.00129 | 0.0264 | 700 | 0.0224 | 0.00326 | 0.0013 | 0.0269 |

FIG. 18

| | A | B | C | D | E | F | G | H |
|---|---|---|---|---|---|---|---|---|
| 1 | | | | Copyright 2000 Honeywell International Inc. | | | | |
| 2 | Phosphor | Formulation | Previous Formulation | Adjustment Needed | Formulation Percent | Enter Starting Formulation | Preliminary Calculation | |
| 3 | Color | | | | | | | |
| 4 | | Grams | Grams | Grams | | | | |
| 5 | Red | 4207.71 g | 4207.71 g | =B5-C5 | =B5/$B$8 | 4000.00 g | =B5 | =(G5/$G$8)*$F$8 |
| 6 | Green | 2613.50 g | 2613.50 g | =B6-C6 | =B6/$B$8 | 2600.00 g | =B6 | =(G6/$G$8)*$F$8 |
| 7 | Blue | 2278.79 g | 2278.79 g | =B7-C7 | =B7/$B$8 | 2500.00 g | =B7 | =(G7/$G$8)*$F$8 |
| 8 | Total | 9100.00 g | | | =SUM(E5:E7) | =SUM(F5:F7) | =B8 | =SUM(H5:H7) |
| 9 | | | | | | | | |
| 10 | | | u' | v' | L (fL) | | | |
| 11 | Calc Lamp ⎯⎯> | | =B202 | =B203 | =B205 | | | |
| 12 | Lamp Measurement | | 0.227 | 0.458 | | | | |
| 13 | Desired Chromaticity | | 0.228 | 0.455 | | | | |

FIG. 19

| | R | S | T | U |
|---|---|---|---|---|
| 4 | | | | |
| 5 | | | u'= | 0.228 |
| 6 | | | v'= | 0.455 |
| 7 | | | Radius= | 0.005 |
| 8 | | θ | x1 | y1 |
| 9 | | 0 | =$U$7*COS(S10*PI()/180)+$U$5 | =$U$7*SIN(S10*PI()/180)+$U$6 |
| 10 | | 20 | =$U$7*COS(S11*PI()/180)+$U$5 | =$U$7*SIN(S11*PI()/180)+$U$6 |
| 11 | | 40 | =$U$7*COS(S12*PI()/180)+$U$5 | =$U$7*SIN(S12*PI()/180)+$U$6 |
| 12 | | 60 | =$U$7*COS(S13*PI()/180)+$U$5 | =$U$7*SIN(S13*PI()/180)+$U$6 |
| 13 | | 80 | =$U$7*COS(S14*PI()/180)+$U$5 | =$U$7*SIN(S14*PI()/180)+$U$6 |
| 14 | | 100 | =$U$7*COS(S15*PI()/180)+$U$5 | =$U$7*SIN(S15*PI()/180)+$U$6 |
| 15 | | 120 | =$U$7*COS(S16*PI()/180)+$U$5 | =$U$7*SIN(S16*PI()/180)+$U$6 |
| 16 | | 140 | =$U$7*COS(S17*PI()/180)+$U$5 | =$U$7*SIN(S17*PI()/180)+$U$6 |
| 17 | | 160 | =$U$7*COS(S18*PI()/180)+$U$5 | =$U$7*SIN(S18*PI()/180)+$U$6 |
| 18 | | 180 | =$U$7*COS(S19*PI()/180)+$U$5 | =$U$7*SIN(S19*PI()/180)+$U$6 |
| 19 | | 200 | =$U$7*COS(S20*PI()/180)+$U$5 | =$U$7*SIN(S20*PI()/180)+$U$6 |
| 20 | | 220 | =$U$7*COS(S21*PI()/180)+$U$5 | =$U$7*SIN(S21*PI()/180)+$U$6 |
| 21 | | 240 | =$U$7*COS(S22*PI()/180)+$U$5 | =$U$7*SIN(S22*PI()/180)+$U$6 |
| 22 | | 260 | =$U$7*COS(S23*PI()/180)+$U$5 | =$U$7*SIN(S23*PI()/180)+$U$6 |
| 23 | | 280 | =$U$7*COS(S24*PI()/180)+$U$5 | =$U$7*SIN(S24*PI()/180)+$U$6 |
| 24 | | 300 | =$U$7*COS(S25*PI()/180)+$U$5 | =$U$7*SIN(S25*PI()/180)+$U$6 |
| 25 | | 320 | =$U$7*COS(S26*PI()/180)+$U$5 | =$U$7*SIN(S26*PI()/180)+$U$6 |
| 26 | | 340 | =$U$7*COS(S27*PI()/180)+$U$5 | =$U$7*SIN(S27*PI()/180)+$U$6 |
| 27 | | 360 | =$U$7*COS(S28*PI()/180)+$U$5 | =$U$7*SIN(S28*PI()/180)+$U$6 |
| 28 | | | | |
| 29 | Calc Lamp | =C11 | | |
| 30 | Desired Chromaticity | =C13 | | |
| 31 | Lamp Measured | =C12 | | |

FIG. 20

|   | V | W | X | Y |
|---|---|---|---|---|
| 9 | Calc Lamp | Desired Chromaticity | Lamp Measured | |
| 10 | | | | |
| 11 | | | | |
| 12 | | | | |
| 13 | | | | |
| 14 | | | | |
| 15 | | | | |
| 16 | | | | |
| 17 | | | | |
| 18 | | | | |
| 19 | | | | |
| 20 | | | | |
| 21 | | | | |
| 22 | | | | |
| 23 | | | | |
| 24 | | | | |
| 25 | | | | |
| 26 | | | | |
| 27 | | | | |
| 28 | | | | |
| 29 | =D11 | | | |
| 30 | | =D13 | | |
| 31 | | | =D12 | |

FIG. 21

| A | B | C | D | E | F | G |
|---|---|---|---|---|---|---|
| Lamp Color Calculation | | | Red Green Blue Phosphor | | | |
| | | | | 7.1W | 7.25W | 7.0W |
| Red | Green | Blue | Wavelength | Red | Green | Blue |
| =K40*Q40 | =K40*R40 | =K40*S40 | 400 | 6.27E-02 | 1.01E-01 | 1.36E-01 |
| =K41*Q41 | =K41*R41 | =K41*S41 | 402 | 1.03E-01 | 1.61E-01 | 2.12E-01 |
| =K42*Q42 | =K42*R42 | =K42*S42 | 404 | 1.14E-01 | 1.81E-01 | 2.42E-01 |
| =K43*Q43 | =K43*R43 | =K43*S43 | 406 | 9.82E-02 | 1.55E-01 | 2.36E-01 |
| =K44*Q44 | =K44*R44 | =K44*S44 | 408 | 6.14E-02 | 9.43E-02 | 1.97E-01 |
| =K45*Q45 | =K45*R45 | =K45*S45 | 410 | 2.24E-02 | 3.54E-02 | 1.58E-01 |
| =K46*Q46 | =K46*R46 | =K46*S46 | 412 | 9.45E-03 | 1.93E-02 | 1.61E-01 |
| =K47*Q47 | =K47*R47 | =K47*S47 | 414 | 9.37E-03 | 1.57E-02 | 1.88E-01 |
| =K48*Q48 | =K48*R48 | =K48*S48 | 416 | 1.01E-02 | 1.63E-02 | 2.27E-01 |
| =K49*Q49 | =K49*R49 | =K49*S49 | 418 | 1.24E-02 | 1.64E-02 | 2.70E-01 |
| =K50*Q50 | =K50*R50 | =K50*S50 | 420 | 1.51E-02 | 1.94E-02 | 3.21E-01 |
| =K51*Q51 | =K51*R51 | =K51*S51 | 422 | 1.71E-02 | 2.21E-02 | 3.78E-01 |
| =K52*Q52 | =K52*R52 | =K52*S52 | 424 | 2.16E-02 | 2.94E-02 | 4.47E-01 |
| =K53*Q53 | =K53*R53 | =K53*S53 | 426 | 2.80E-02 | 3.87E-02 | 5.24E-01 |
| =K54*Q54 | =K54*R54 | =K54*S54 | 428 | 4.31E-02 | 5.99E-02 | 6.13E-01 |
| =K55*Q55 | =K55*R55 | =K55*S55 | 430 | 9.49E-02 | 1.33E-01 | 7.52E-01 |
| =K56*Q56 | =K56*R56 | =K56*S56 | 432 | 2.35E-01 | 3.38E-01 | 1.03E+00 |
| =K57*Q57 | =K57*R57 | =K57*S57 | 434 | 3.09E-01 | 4.50E-01 | 1.20E+00 |
| =K58*Q58 | =K58*R58 | =K58*S58 | 436 | 2.86E-01 | 4.14E-01 | 1.21E+00 |
| =K59*Q59 | =K59*R59 | =K59*S59 | 438 | 2.04E-01 | 2.95E-01 | 1.14E+00 |
| =K60*Q60 | =K60*R60 | =K60*S60 | 440 | 5.66E-02 | 8.29E-02 | 9.44E-01 |

FIG. 22

| | A | B | C | D | E | F | G |
|---|---|---|---|---|---|---|---|
| 61 | =K61*Q61 | =K61*R61 | =K61*S61 | 442 | 6.38E-03 | 8.46E-03 | 9.01E-01 |
| 62 | =K62*Q62 | =K62*R62 | =K62*S62 | 444 | 4.79E-03 | 5.19E-03 | 9.35E-01 |
| 63 | =K63*Q63 | =K63*R63 | =K63*S63 | 446 | 4.82E-03 | 5.27E-03 | 9.73E-01 |
| 64 | =K64*Q64 | =K64*R64 | =K64*S64 | 448 | 3.53E-03 | 5.50E-03 | 1.00E+00 |
| 65 | =K65*Q65 | =K65*R65 | =K65*S65 | 450 | 3.95E-03 | 5.92E-03 | 1.02E+00 |
| 66 | =K66*Q66 | =K66*R66 | =K66*S66 | 452 | 4.40E-03 | 5.76E-03 | 1.05E+00 |
| 67 | =K67*Q67 | =K67*R67 | =K67*S67 | 454 | 4.43E-03 | 4.86E-03 | 1.05E+00 |
| 68 | =K68*Q68 | =K68*R68 | =K68*S68 | 456 | 4.45E-03 | 4.07E-03 | 1.04E+00 |
| 69 | =K69*Q69 | =K69*R69 | =K69*S69 | 458 | 4.06E-03 | 5.38E-03 | 1.01E+00 |
| 70 | =K70*Q70 | =K70*R70 | =K70*S70 | 460 | 4.93E-03 | 5.24E-03 | 9.73E-01 |
| 71 | =K71*Q71 | =K71*R71 | =K71*S71 | 462 | 5.73E-03 | 6.80E-03 | 9.28E-01 |
| 72 | =K72*Q72 | =K72*R72 | =K72*S72 | 464 | 7.87E-03 | 5.12E-03 | 8.85E-01 |
| 73 | =K73*Q73 | =K73*R73 | =K73*S73 | 466 | 7.23E-03 | 5.86E-03 | 8.40E-01 |
| 74 | =K74*Q74 | =K74*R74 | =K74*S74 | 468 | 6.67E-03 | 6.80E-03 | 7.99E-01 |
| 75 | =K75*Q75 | =K75*R75 | =K75*S75 | 470 | 6.46E-03 | 9.84E-03 | 7.65E-01 |
| 76 | =K76*Q76 | =K76*R76 | =K76*S76 | 472 | 5.54E-03 | 1.48E-02 | 7.34E-01 |
| 77 | =K77*Q77 | =K77*R77 | =K77*S77 | 474 | 4.94E-03 | 2.24E-02 | 7.03E-01 |
| 78 | =K78*Q78 | =K78*R78 | =K78*S78 | 476 | 5.07E-03 | 4.18E-02 | 6.62E-01 |
| 79 | =K79*Q79 | =K79*R79 | =K79*S79 | 478 | 3.74E-03 | 8.21E-02 | 6.30E-01 |
| 80 | =K80*Q80 | =K80*R80 | =K80*S80 | 480 | 3.71E-03 | 1.69E-01 | 5.93E-01 |
| 81 | =K81*Q81 | =K81*R81 | =K81*S81 | 482 | 4.70E-03 | 3.08E-01 | 5.54E-01 |
| 82 | =K82*Q82 | =K82*R82 | =K82*S82 | 484 | 5.91E-03 | 4.60E-01 | 5.10E-01 |
| 83 | =K83*Q83 | =K83*R83 | =K83*S83 | 486 | 6.24E-03 | 5.41E-01 | 4.65E-01 |
| 84 | =K84*Q84 | =K84*R84 | =K84*S84 | 488 | 6.98E-03 | 5.26E-01 | 4.25E-01 |
| 85 | =K85*Q85 | =K85*R85 | =K85*S85 | 490 | 6.63E-03 | 4.45E-01 | 3.88E-01 |
| 86 | =K86*Q86 | =K86*R86 | =K86*S86 | 492 | 5.99E-03 | 3.50E-01 | 3.54E-01 |

FIG. 23

|    | A | B | C | D | E | F | G |
|----|---|---|---|---|---|---|---|
| 87 | =K87*Q87 | =K87*R87 | =K87*S87 | 494 | 5.08E-03 | 2.64E-01 | 3.19E-01 |
| 88 | =K88*Q88 | =K88*R88 | =K88*S88 | 496 | 6.47E-03 | 1.93E-01 | 2.88E-01 |
| 89 | =K89*Q89 | =K89*R89 | =K89*S89 | 498 | 5.41E-03 | 1.39E-01 | 2.64E-01 |
| 90 | =K90*Q90 | =K90*R90 | =K90*S90 | 500 | 4.89E-03 | 9.73E-02 | 2.43E-01 |
| 91 | =K91*Q91 | =K91*R91 | =K91*S91 | 502 | 3.19E-03 | 6.52E-02 | 2.23E-01 |
| 92 | =K92*Q92 | =K92*R92 | =K92*S92 | 504 | 3.86E-03 | 4.32E-02 | 2.03E-01 |
| 93 | =K93*Q93 | =K93*R93 | =K93*S93 | 506 | 3.13E-03 | 2.71E-02 | 1.88E-01 |
| 94 | =K94*Q94 | =K94*R94 | =K94*S94 | 508 | 4.33E-03 | 1.89E-02 | 1.74E-01 |
| 95 | =K95*Q95 | =K95*R95 | =K95*S95 | 510 | 5.23E-03 | 1.38E-02 | 1.61E-01 |
| 96 | =K96*Q96 | =K96*R96 | =K96*S96 | 512 | 5.65E-03 | 1.45E-02 | 1.49E-01 |
| 97 | =K97*Q97 | =K97*R97 | =K97*S97 | 514 | 5.56E-03 | 1.06E-02 | 1.34E-01 |
| 98 | =K98*Q98 | =K98*R98 | =K98*S98 | 516 | 4.24E-03 | 1.03E-02 | 1.23E-01 |
| 99 | =K99*Q99 | =K99*R99 | =K99*S99 | 518 | 3.25E-03 | 9.09E-03 | 1.11E-01 |
| 100 | =K100*Q100 | =K100*R100 | =K100*S100 | 520 | 2.77E-03 | 9.79E-03 | 1.01E-01 |
| 101 | =K101*Q101 | =K101*R101 | =K101*S101 | 522 | 3.73E-03 | 9.44E-03 | 9.02E-02 |
| 102 | =K102*Q102 | =K102*R102 | =K102*S102 | 524 | 3.92E-03 | 1.24E-02 | 8.14E-02 |
| 103 | =K103*Q103 | =K103*R103 | =K103*S103 | 526 | 4.87E-03 | 1.62E-02 | 7.34E-02 |
| 104 | =K104*Q104 | =K104*R104 | =K104*S104 | 528 | 1.02E-02 | 2.20E-02 | 6.66E-02 |
| 105 | =K105*Q105 | =K105*R105 | =K105*S105 | 530 | 1.83E-02 | 3.45E-02 | 6.08E-02 |
| 106 | =K106*Q106 | =K106*R106 | =K106*S106 | 532 | 2.44E-02 | 7.32E-02 | 5.59E-02 |
| 107 | =K107*Q107 | =K107*R107 | =K107*S107 | 534 | 2.95E-02 | 1.92E-01 | 5.17E-02 |
| 108 | =K108*Q108 | =K108*R108 | =K108*S108 | 536 | 2.79E-02 | 6.09E-01 | 4.85E-02 |
| 109 | =K109*Q109 | =K109*R109 | =K109*S109 | 538 | 2.58E-02 | 1.30E-01 | 5.11E-02 |
| 110 | =K110*Q110 | =K110*R110 | =K110*S110 | 540 | 6.31E-02 | 1.99E+00 | 1.13E-01 |
| 111 | =K111*Q111 | =K111*R111 | =K111*S111 | 542 | 1.58E-01 | 2.58E+00 | 2.71E-01 |

FIG. 24

| | A | B | C | D | E | F | G |
|---|---|---|---|---|---|---|---|
| 112 | =K112*Q112 | =K112*R112 | =K112*S112 | 544 | 2.12E-01 | 2.72E+00 | 3.63E-01 |
| 113 | =K113*Q113 | =K113*R113 | =K113*S113 | 546 | 2.14E-01 | 2.29E+00 | 3.68E-01 |
| 114 | =K114*Q114 | =K114*R114 | =K114*S114 | 548 | 1.60E-01 | 1.71E+00 | 2.72E-01 |
| 115 | =K115*Q115 | =K115*R115 | =K115*S115 | 550 | 6.08E-02 | 1.06E+00 | 9.93E-02 |
| 116 | =K116*Q116 | =K116*R116 | =K116*S116 | 552 | 2.64E-02 | 5.99E-01 | 3.91E-02 |
| 117 | =K117*Q117 | =K117*R117 | =K117*S117 | 554 | 1.84E-02 | 3.35E-01 | 2.96E-02 |
| 118 | =K118*Q118 | =K118*R118 | =K118*S118 | 556 | 1.17E-02 | 1.86E-01 | 2.43E-02 |
| 119 | =K119*Q119 | =K119*R119 | =K119*S119 | 558 | 9.45E-03 | 1.06E-01 | 2.16E-02 |
| 120 | =K120*Q120 | =K120*R120 | =K120*S120 | 560 | 1.13E-02 | 7.38E-02 | 1.92E-02 |
| 121 | =K121*Q121 | =K121*R121 | =K121*S121 | 562 | 1.28E-02 | 5.29E-02 | 1.78E-02 |
| 122 | =K122*Q122 | =K122*R122 | =K122*S122 | 564 | 1.53E-02 | 4.03E-02 | 1.67E-02 |
| 123 | =K123*Q123 | =K123*R123 | =K123*S123 | 566 | 1.49E-02 | 3.17E-02 | 1.54E-02 |
| 124 | =K124*Q124 | =K124*R124 | =K124*S124 | 568 | 1.30E-02 | 2.60E-02 | 1.52E-02 |
| 125 | =K125*Q125 | =K125*R125 | =K125*S125 | 570 | 1.40E-02 | 2.69E-02 | 1.78E-02 |
| 126 | =K126*Q126 | =K126*R126 | =K126*S126 | 572 | 2.99E-02 | 6.13E-02 | 4.25E-02 |
| 127 | =K127*Q127 | =K127*R127 | =K127*S127 | 574 | 6.42E-02 | 1.26E-01 | 8.73E-02 |
| 128 | =K128*Q128 | =K128*R128 | =K128*S128 | 576 | 1.08E-01 | 1.92E-01 | 1.18E-01 |
| 129 | =K129*Q129 | =K129*R129 | =K129*S129 | 578 | 1.40E-01 | 2.67E-01 | 1.20E-01 |
| 130 | =K130*Q130 | =K130*R130 | =K130*S130 | 580 | 1.42E-01 | 3.43E-01 | 8.80E-02 |
| 131 | =K131*Q131 | =K131*R131 | =K131*S131 | 582 | 1.50E-01 | 3.93E-01 | 4.13E-02 |
| 132 | =K132*Q132 | =K132*R132 | =K132*S132 | 584 | 1.73E-01 | 4.03E-01 | 1.91E-02 |
| 133 | =K133*Q133 | =K133*R133 | =K133*S133 | 586 | 1.88E-01 | 3.71E-01 | 1.39E-02 |
| 134 | =K134*Q134 | =K134*R134 | =K134*S134 | 588 | 2.28E-01 | 3.01E-01 | 1.17E-02 |
| 135 | =K135*Q135 | =K135*R135 | =K135*S135 | 590 | 2.50E-01 | 2.32E-01 | 1.05E-02 |
| 136 | =K136*Q136 | =K136*R136 | =K136*S136 | 592 | 2.46E-01 | 1.75E-01 | 9.05E-03 |
| 137 | =K137*Q137 | =K137*R137 | =K137*S137 | 594 | 2.59E-01 | 1.20E-01 | 8.60E-03 |

FIG. 25

| | A | B | C | D | E | F | G |
|---|---|---|---|---|---|---|---|
| 138 | =K138*Q138 | =K138*R138 | =K138*S138 | 596 | 2.48E-01 | 8.60E-02 | 7.66E-03 |
| 139 | =K139*Q139 | =K139*R139 | =K139*S139 | 598 | 2.21E-01 | 6.06E-02 | 7.18E-03 |
| 140 | =K140*Q140 | =K140*R140 | =K140*S140 | 600 | 2.06E-01 | 4.35E-02 | 6.58E-03 |
| 141 | =K141*Q141 | =K141*R141 | =K141*S141 | 602 | 1.88E-01 | 2.93E-02 | 6.31E-03 |
| 142 | =K142*Q142 | =K142*R142 | =K142*S142 | 604 | 2.46E-01 | 2.33E-02 | 6.57E-03 |
| 143 | =K143*Q143 | =K143*R143 | =K143*S143 | 606 | 8.29E-01 | 2.25E-02 | 8.43E-03 |
| 144 | =K144*Q144 | =K144*R144 | =K144*S144 | 608 | 1.63E+00 | 2.77E-02 | 1.00E-02 |
| 145 | =K145*Q145 | =K145*R145 | =K145*S145 | 610 | 2.08E+00 | 3.95E-02 | 1.20E-02 |
| 146 | =K146*Q146 | =K146*R146 | =K146*S146 | 612 | 2.07E+00 | 6.47E-02 | 1.16E-02 |
| 147 | =K147*Q147 | =K147*R147 | =K147*S147 | 614 | 1.50E+00 | 1.03E-01 | 9.20E-03 |
| 148 | =K148*Q148 | =K148*R148 | =K148*S148 | 616 | 8.20E-01 | 1.53E-01 | 7.43E-03 |
| 149 | =K149*Q149 | =K149*R149 | =K149*S149 | 618 | 4.27E-01 | 2.11E-01 | 6.19E-03 |
| 150 | =K150*Q150 | =K150*R150 | =K150*S150 | 620 | 2.71E-01 | 2.56E-01 | 5.48E-03 |
| 151 | =K151*Q151 | =K151*R151 | =K151*S151 | 622 | 2.39E-01 | 2.76E-01 | 5.60E-03 |
| 152 | =K152*Q152 | =K152*R152 | =K152*S152 | 624 | 2.53E-01 | 2.53E-01 | 5.05E-03 |
| 153 | =K153*Q153 | =K153*R153 | =K153*S153 | 626 | 3.09E-01 | 2.03E-01 | 4.70E-03 |
| 154 | =K154*Q154 | =K154*R154 | =K154*S154 | 628 | 3.52E-01 | 1.40E-01 | 4.20E-03 |
| 155 | =K155*Q155 | =K155*R155 | =K155*S155 | 630 | 3.39E-01 | 8.49E-02 | 4.08E-03 |
| 156 | =K156*Q156 | =K156*R156 | =K156*S156 | 632 | 2.76E-01 | 4.92E-02 | 4.03E-03 |
| 157 | =K157*Q157 | =K157*R157 | =K157*S157 | 634 | 1.67E-01 | 3.68E-02 | 3.33E-03 |
| 158 | =K158*Q158 | =K158*R158 | =K158*S158 | 636 | 9.57E-02 | 2.87E-02 | 2.82E-03 |
| 159 | =K159*Q159 | =K159*R159 | =K159*S159 | 638 | 7.03E-02 | 2.54E-02 | 3.05E-03 |
| 160 | =K160*Q160 | =K160*R160 | =K160*S160 | 640 | 5.98E-02 | 2.86E-02 | 3.13E-03 |
| 161 | =K161*Q161 | =K161*R161 | =K161*S161 | 642 | 5.16E-02 | 3.01E-02 | 2.79E-03 |
| 162 | =K162*Q162 | =K162*R162 | =K162*S162 | 644 | 4.94E-02 | 3.44E-02 | 2.43E-03 |
| 163 | =K163*Q163 | =K163*R163 | =K163*S163 | 646 | 6.67E-02 | 4.19E-02 | 3.17E-03 |

FIG. 26

| | A | B | C | D | E | F | G |
|---|---|---|---|---|---|---|---|
| 164 | =K164*Q164 | =K164*R164 | =K164*S164 | 648 | 8.41E-02 | 4.54E-02 | 3.31E-03 |
| 165 | =K165*Q165 | =K165*R165 | =K165*S165 | 650 | 9.10E-02 | 5.06E-02 | 3.01E-03 |
| 166 | =K166*Q166 | =K166*R166 | =K166*S166 | 652 | 8.47E-02 | 5.11E-02 | 2.50E-03 |
| 167 | =K167*Q167 | =K167*R167 | =K167*S167 | 654 | 6.50E-02 | 5.03E-02 | 2.59E-03 |
| 168 | =K168*Q168 | =K168*R168 | =K168*S168 | 656 | 5.08E-02 | 5.03E-02 | 1.92E-03 |
| 169 | =K169*Q169 | =K169*R169 | =K169*S169 | 658 | 5.19E-02 | 4.68E-02 | 2.13E-03 |
| 170 | =K170*Q170 | =K170*R170 | =K170*S170 | 660 | 5.69E-02 | 4.00E-02 | 1.86E-03 |
| 171 | =K171*Q171 | =K171*R171 | =K171*S171 | 662 | 5.61E-02 | 3.80E-02 | 1.81E-03 |
| 172 | =K172*Q172 | =K172*R172 | =K172*S172 | 664 | 4.77E-02 | 3.79E-02 | 1.93E-03 |
| 173 | =K173*Q173 | =K173*R173 | =K173*S173 | 666 | 3.47E-02 | 3.86E-02 | 2.12E-03 |
| 174 | =K174*Q174 | =K174*R174 | =K174*S174 | 668 | 2.52E-02 | 4.14E-02 | 1.62E-03 |
| 175 | =K175*Q175 | =K175*R175 | =K175*S175 | 670 | 2.04E-02 | 4.07E-02 | 1.39E-03 |
| 176 | =K176*Q176 | =K176*R176 | =K176*S176 | 672 | 1.80E-02 | 3.64E-02 | 1.05E-03 |
| 177 | =K177*Q177 | =K177*R177 | =K177*S177 | 674 | 1.55E-02 | 3.52E-02 | 2.16E-03 |
| 178 | =K178*Q178 | =K178*R178 | =K178*S178 | 676 | 1.41E-02 | 3.76E-02 | 1.43E-03 |
| 179 | =K179*Q179 | =K179*R179 | =K179*S179 | 678 | 1.27E-02 | 4.31E-02 | 1.44E-03 |
| 180 | =K180*Q180 | =K180*R180 | =K180*S180 | 680 | 1.61E-02 | 4.27E-02 | 1.10E-03 |
| 181 | =K181*Q181 | =K181*R181 | =K181*S181 | 682 | 2.55E-02 | 4.08E-02 | 9.77E-04 |
| 182 | =K182*Q182 | =K182*R182 | =K182*S182 | 684 | 4.16E-02 | 3.61E-02 | 1.20E-03 |
| 183 | =K183*Q183 | =K183*R183 | =K183*S183 | 686 | 5.38E-02 | 2.82E-02 | 2.15E-03 |
| 184 | =K184*Q184 | =K184*R184 | =K184*S184 | 688 | 5.65E-02 | 2.27E-02 | 3.51E-03 |
| 185 | =K185*Q185 | =K185*R185 | =K185*S185 | 690 | 5.78E-02 | 1.49E-02 | 3.40E-03 |
| 186 | =K186*Q186 | =K186*R186 | =K186*S186 | 692 | 5.94E-02 | 1.73E-02 | 5.46E-03 |
| 187 | =K187*Q187 | =K187*R187 | =K187*S187 | 694 | 6.20E-02 | 1.99E-02 | 7.41E-03 |
| 188 | =K188*Q188 | =K188*R188 | =K188*S188 | 696 | 5.33E-02 | 1.78E-02 | 7.64E-03 |
| 189 | =K189*Q189 | =K189*R189 | =K189*S189 | 698 | 4.28E-02 | 1.53E-02 | 7.18E-03 |
| 190 | =K190*Q190 | =K190*R190 | =K190*S190 | 700 | 4.74E-02 | 1.11E-02 | 5.15E-03 |

FIG. 27

|     | A | B | C |
|---|---|---|---|
| 192 | =SUM(A40:A190)*2 | =SUM(B40:B190)*2 | =SUM(C40:C190)*2 |
| 193 | | | |
| 194 | Red | | |
| 195 | X | =(A192) | |
| 196 | Y | =(B192) | |
| 197 | Z | =(C192) | |
| 198 | | =(B195)/(B195+B196+B197) | |
| 199 | x | =(B196)/(B195+B196+B197) | |
| 200 | y | | |
| 201 | | =(4*B199)/(3+12*B200-2*B199) | |
| 202 | u' | =(9*B200)/(3+12*B200-2*B199) | |
| 203 | v' | | |
| 204 | | =(B196*683*0.2919) | |
| 205 | L | | |

FIG. 28

| | H | I | J | K |
|---|---|---|---|---|
| 36 | Spectral Emissions of Mixture | | | |
| 37 | | | | |
| 38 | Red | Green | Blue | White |
| 39 | | | | |
| 40 | =E40*$E$5 | =F40*$E$6 | =G40*$E$7 | =(($E$5*E40)+($E$6*F40)+($E$7*G40)) |
| 41 | =E41*$E$5 | =F41*$E$6 | =G41*$E$7 | =(($E$5*E41)+($E$6*F41)+($E$7*G41)) |
| 42 | =E42*$E$5 | =F42*$E$6 | =G42*$E$7 | =(($E$5*E42)+($E$6*F42)+($E$7*G42)) |
| 43 | =E43*$E$5 | =F43*$E$6 | =G43*$E$7 | =(($E$5*E43)+($E$6*F43)+($E$7*G43)) |
| 44 | =E44*$E$5 | =F44*$E$6 | =G44*$E$7 | =(($E$5*E44)+($E$6*F44)+($E$7*G44)) |
| 45 | =E45*$E$5 | =F45*$E$6 | =G45*$E$7 | =(($E$5*E45)+($E$6*F45)+($E$7*G45)) |
| 46 | =E46*$E$5 | =F46*$E$6 | =G46*$E$7 | =(($E$5*E46)+($E$6*F46)+($E$7*G46)) |
| 47 | =E47*$E$5 | =F47*$E$6 | =G47*$E$7 | =(($E$5*E47)+($E$6*F47)+($E$7*G47)) |
| 48 | =E48*$E$5 | =F48*$E$6 | =G48*$E$7 | =(($E$5*E48)+($E$6*F48)+($E$7*G48)) |
| 49 | =E49*$E$5 | =F49*$E$6 | =G49*$E$7 | =(($E$5*E49)+($E$6*F49)+($E$7*G49)) |
| 50 | =E50*$E$5 | =F50*$E$6 | =G50*$E$7 | =(($E$5*E50)+($E$6*F50)+($E$7*G50)) |
| 51 | =E51*$E$5 | =F51*$E$6 | =G51*$E$7 | =(($E$5*E51)+($E$6*F51)+($E$7*G51)) |
| 52 | =E52*$E$5 | =F52*$E$6 | =G52*$E$7 | =(($E$5*E52)+($E$6*F52)+($E$7*G52)) |
| 53 | =E53*$E$5 | =F53*$E$6 | =G53*$E$7 | =(($E$5*E53)+($E$6*F53)+($E$7*G53)) |
| 54 | =E54*$E$5 | =F54*$E$6 | =G54*$E$7 | =(($E$5*E54)+($E$6*F54)+($E$7*G54)) |
| 55 | =E55*$E$5 | =F55*$E$6 | =G55*$E$7 | =(($E$5*E55)+($E$6*F55)+($E$7*G55)) |
| 56 | =E56*$E$5 | =F56*$E$6 | =G56*$E$7 | =(($E$5*E56)+($E$6*F56)+($E$7*G56)) |
| 57 | =E57*$E$5 | =F57*$E$6 | =G57*$E$7 | =(($E$5*E57)+($E$6*F57)+($E$7*G57)) |
| 58 | =E58*$E$5 | =F58*$E$6 | =G58*$E$7 | =(($E$5*E58)+($E$6*F58)+($E$7*G58)) |
| 59 | =E59*$E$5 | =F59*$E$6 | =G59*$E$7 | =(($E$5*E59)+($E$6*F59)+($E$7*G59)) |
| 60 | =E60*$E$5 | =F60*$E$6 | =G60*$E$7 | =(($E$5*E60)+($E$6*F60)+($E$7*G60)) |

FIG. 29

| | H | I | J | K |
|---|---|---|---|---|
| 61 | =E61*$E$5 | =F61*$E$6 | =G61*$E$7 | =(($E$5*E61)+($E$6*F61)+($E$7*G61)) |
| 62 | =E62*$E$5 | =F62*$E$6 | =G62*$E$7 | =(($E$5*E62)+($E$6*F62)+($E$7*G62)) |
| 63 | =E63*$E$5 | =F63*$E$6 | =G63*$E$7 | =(($E$5*E63)+($E$6*F63)+($E$7*G63)) |
| 64 | =E64*$E$5 | =F64*$E$6 | =G64*$E$7 | =(($E$5*E64)+($E$6*F64)+($E$7*G64)) |
| 65 | =E65*$E$5 | =F65*$E$6 | =G65*$E$7 | =(($E$5*E65)+($E$6*F65)+($E$7*G65)) |
| 66 | =E66*$E$5 | =F66*$E$6 | =G66*$E$7 | =(($E$5*E66)+($E$6*F66)+($E$7*G66)) |
| 67 | =E67*$E$5 | =F67*$E$6 | =G67*$E$7 | =(($E$5*E67)+($E$6*F67)+($E$7*G67)) |
| 68 | =E68*$E$5 | =F68*$E$6 | =G68*$E$7 | =(($E$5*E68)+($E$6*F68)+($E$7*G68)) |
| 69 | =E69*$E$5 | =F69*$E$6 | =G69*$E$7 | =(($E$5*E69)+($E$6*F69)+($E$7*G69)) |
| 70 | =E70*$E$5 | =F70*$E$6 | =G70*$E$7 | =(($E$5*E70)+($E$6*F70)+($E$7*G70)) |
| 71 | =E71*$E$5 | =F71*$E$6 | =G71*$E$7 | =(($E$5*E71)+($E$6*F71)+($E$7*G71)) |
| 72 | =E72*$E$5 | =F72*$E$6 | =G72*$E$7 | =(($E$5*E72)+($E$6*F72)+($E$7*G72)) |
| 73 | =E73*$E$5 | =F73*$E$6 | =G73*$E$7 | =(($E$5*E73)+($E$6*F73)+($E$7*G73)) |
| 74 | =E74*$E$5 | =F74*$E$6 | =G74*$E$7 | =(($E$5*E74)+($E$6*F74)+($E$7*G74)) |
| 75 | =E75*$E$5 | =F75*$E$6 | =G75*$E$7 | =(($E$5*E75)+($E$6*F75)+($E$7*G75)) |
| 76 | =E76*$E$5 | =F76*$E$6 | =G76*$E$7 | =(($E$5*E76)+($E$6*F76)+($E$7*G76)) |
| 77 | =E77*$E$5 | =F77*$E$6 | =G77*$E$7 | =(($E$5*E77)+($E$6*F77)+($E$7*G77)) |
| 78 | =E78*$E$5 | =F78*$E$6 | =G78*$E$7 | =(($E$5*E78)+($E$6*F78)+($E$7*G78)) |
| 79 | =E79*$E$5 | =F79*$E$6 | =G79*$E$7 | =(($E$5*E79)+($E$6*F79)+($E$7*G79)) |
| 80 | =E80*$E$5 | =F80*$E$6 | =G80*$E$7 | =(($E$5*E80)+($E$6*F80)+($E$7*G80)) |
| 81 | =E81*$E$5 | =F81*$E$6 | =G81*$E$7 | =(($E$5*E81)+($E$6*F81)+($E$7*G81)) |
| 82 | =E82*$E$5 | =F82*$E$6 | =G82*$E$7 | =(($E$5*E82)+($E$6*F82)+($E$7*G82)) |
| 83 | =E83*$E$5 | =F83*$E$6 | =G83*$E$7 | =(($E$5*E83)+($E$6*F83)+($E$7*G83)) |
| 84 | =E84*$E$5 | =F84*$E$6 | =G84*$E$7 | =(($E$5*E84)+($E$6*F84)+($E$7*G84)) |
| 85 | =E85*$E$5 | =F85*$E$6 | =G85*$E$7 | =(($E$5*E85)+($E$6*F85)+($E$7*G85)) |
| 86 | =E86*$E$5 | =F86*$E$6 | =G86*$E$7 | =(($E$5*E86)+($E$6*F86)+($E$7*G86)) |

FIG. 30

| | H | I | J | K |
|---|---|---|---|---|
| 87 | =E87*$E$5 | =F87*$E$6 | =G87*$E$7 | =(($E$5*E87)+($E$6*F87)+($E$7*G87)) |
| 88 | =E88*$E$5 | =F88*$E$6 | =G88*$E$7 | =(($E$5*E88)+($E$6*F88)+($E$7*G88)) |
| 89 | =E89*$E$5 | =F89*$E$6 | =G89*$E$7 | =(($E$5*E89)+($E$6*F89)+($E$7*G89)) |
| 90 | =E90*$E$5 | =F90*$E$6 | =G90*$E$7 | =(($E$5*E90)+($E$6*F90)+($E$7*G90)) |
| 91 | =E91*$E$5 | =F91*$E$6 | =G91*$E$7 | =(($E$5*E91)+($E$6*F91)+($E$7*G91)) |
| 92 | =E92*$E$5 | =F92*$E$6 | =G92*$E$7 | =(($E$5*E92)+($E$6*F92)+($E$7*G92)) |
| 93 | =E93*$E$5 | =F93*$E$6 | =G93*$E$7 | =(($E$5*E93)+($E$6*F93)+($E$7*G93)) |
| 94 | =E94*$E$5 | =F94*$E$6 | =G94*$E$7 | =(($E$5*E94)+($E$6*F94)+($E$7*G94)) |
| 95 | =E95*$E$5 | =F95*$E$6 | =G95*$E$7 | =(($E$5*E95)+($E$6*F95)+($E$7*G95)) |
| 96 | =E96*$E$5 | =F96*$E$6 | =G96*$E$7 | =(($E$5*E96)+($E$6*F96)+($E$7*G96)) |
| 97 | =E97*$E$5 | =F97*$E$6 | =G97*$E$7 | =(($E$5*E97)+($E$6*F97)+($E$7*G97)) |
| 98 | =E98*$E$5 | =F98*$E$6 | =G98*$E$7 | =(($E$5*E98)+($E$6*F98)+($E$7*G98)) |
| 99 | =E99*$E$5 | =F99*$E$6 | =G99*$E$7 | =(($E$5*E99)+($E$6*F99)+($E$7*G99)) |
| 100 | =E100*$E$5 | =F100*$E$6 | =G100*$E$7 | =(($E$5*E100)+($E$6*F100)+($E$7*G100)) |
| 101 | =E101*$E$5 | =F101*$E$6 | =G101*$E$7 | =(($E$5*E101)+($E$6*F101)+($E$7*G101)) |
| 102 | =E102*$E$5 | =F102*$E$6 | =G102*$E$7 | =(($E$5*E102)+($E$6*F102)+($E$7*G102)) |
| 103 | =E103*$E$5 | =F103*$E$6 | =G103*$E$7 | =(($E$5*E103)+($E$6*F103)+($E$7*G103)) |
| 104 | =E104*$E$5 | =F104*$E$6 | =G104*$E$7 | =(($E$5*E104)+($E$6*F104)+($E$7*G104)) |
| 105 | =E105*$E$5 | =F105*$E$6 | =G105*$E$7 | =(($E$5*E105)+($E$6*F105)+($E$7*G105)) |
| 106 | =E106*$E$5 | =F106*$E$6 | =G106*$E$7 | =(($E$5*E106)+($E$6*F106)+($E$7*G106)) |
| 107 | =E107*$E$5 | =F107*$E$6 | =G107*$E$7 | =(($E$5*E107)+($E$6*F107)+($E$7*G107)) |
| 108 | =E108*$E$5 | =F108*$E$6 | =G108*$E$7 | =(($E$5*E108)+($E$6*F108)+($E$7*G108)) |
| 109 | =E109*$E$5 | =F109*$E$6 | =G109*$E$7 | =(($E$5*E109)+($E$6*F109)+($E$7*G109)) |
| 110 | =E110*$E$5 | =F110*$E$6 | =G110*$E$7 | =(($E$5*E110)+($E$6*F110)+($E$7*G110)) |
| 111 | =E111*$E$5 | =F111*$E$6 | =G111*$E$7 | =(($E$5*E111)+($E$6*F111)+($E$7*G111)) |

FIG. 31

| | H | I | J | K |
|---|---|---|---|---|
| 112 | =E112*$E$5 | =F112*$E$6 | =G112*$E$7 | =(($E$5*E112)+($E$6*F112)+($E$7*G112)) |
| 113 | =E113*$E$5 | =F113*$E$6 | =G113*$E$7 | =(($E$5*E113)+($E$6*F113)+($E$7*G113)) |
| 114 | =E114*$E$5 | =F114*$E$6 | =G114*$E$7 | =(($E$5*E114)+($E$6*F114)+($E$7*G114)) |
| 115 | =E115*$E$5 | =F115*$E$6 | =G115*$E$7 | =(($E$5*E115)+($E$6*F115)+($E$7*G115)) |
| 116 | =E116*$E$5 | =F116*$E$6 | =G116*$E$7 | =(($E$5*E116)+($E$6*F116)+($E$7*G116)) |
| 117 | =E117*$E$5 | =F117*$E$6 | =G117*$E$7 | =(($E$5*E117)+($E$6*F117)+($E$7*G117)) |
| 118 | =E118*$E$5 | =F118*$E$6 | =G118*$E$7 | =(($E$5*E118)+($E$6*F118)+($E$7*G118)) |
| 119 | =E119*$E$5 | =F119*$E$6 | =G119*$E$7 | =(($E$5*E119)+($E$6*F119)+($E$7*G119)) |
| 120 | =E120*$E$5 | =F120*$E$6 | =G120*$E$7 | =(($E$5*E120)+($E$6*F120)+($E$7*G120)) |
| 121 | =E121*$E$5 | =F121*$E$6 | =G121*$E$7 | =(($E$5*E121)+($E$6*F121)+($E$7*G121)) |
| 122 | =E122*$E$5 | =F122*$E$6 | =G122*$E$7 | =(($E$5*E122)+($E$6*F122)+($E$7*G122)) |
| 123 | =E123*$E$5 | =F123*$E$6 | =G123*$E$7 | =(($E$5*E123)+($E$6*F123)+($E$7*G123)) |
| 124 | =E124*$E$5 | =F124*$E$6 | =G124*$E$7 | =(($E$5*E124)+($E$6*F124)+($E$7*G124)) |
| 125 | =E125*$E$5 | =F125*$E$6 | =G125*$E$7 | =(($E$5*E125)+($E$6*F125)+($E$7*G125)) |
| 126 | =E126*$E$5 | =F126*$E$6 | =G126*$E$7 | =(($E$5*E126)+($E$6*F126)+($E$7*G126)) |
| 127 | =E127*$E$5 | =F127*$E$6 | =G127*$E$7 | =(($E$5*E127)+($E$6*F127)+($E$7*G127)) |
| 128 | =E128*$E$5 | =F128*$E$6 | =G128*$E$7 | =(($E$5*E128)+($E$6*F128)+($E$7*G128)) |
| 129 | =E129*$E$5 | =F129*$E$6 | =G129*$E$7 | =(($E$5*E129)+($E$6*F129)+($E$7*G129)) |
| 130 | =E130*$E$5 | =F130*$E$6 | =G130*$E$7 | =(($E$5*E130)+($E$6*F130)+($E$7*G130)) |
| 131 | =E131*$E$5 | =F131*$E$6 | =G131*$E$7 | =(($E$5*E131)+($E$6*F131)+($E$7*G131)) |
| 132 | =E132*$E$5 | =F132*$E$6 | =G132*$E$7 | =(($E$5*E132)+($E$6*F132)+($E$7*G132)) |
| 133 | =E133*$E$5 | =F133*$E$6 | =G133*$E$7 | =(($E$5*E133)+($E$6*F133)+($E$7*G133)) |
| 134 | =E134*$E$5 | =F134*$E$6 | =G134*$E$7 | =(($E$5*E134)+($E$6*F134)+($E$7*G134)) |
| 135 | =E135*$E$5 | =F135*$E$6 | =G135*$E$7 | =(($E$5*E135)+($E$6*F135)+($E$7*G135)) |
| 136 | =E136*$E$5 | =F136*$E$6 | =G136*$E$7 | =(($E$5*E136)+($E$6*F136)+($E$7*G136)) |
| 137 | =E137*$E$5 | =F137*$E$6 | =G137*$E$7 | =(($E$5*E137)+($E$6*F137)+($E$7*G137)) |

FIG. 32

| | H | I | J | K |
|---|---|---|---|---|
| 138 | =E138*$E$5 | =F138*$E$6 | =G138*$E$7 | =(($E$5*E138)+($E$6*F138)+($E$7*G138)) |
| 139 | =E139*$E$5 | =F139*$E$6 | =G139*$E$7 | =(($E$5*E139)+($E$6*F139)+($E$7*G139)) |
| 140 | =E140*$E$5 | =F140*$E$6 | =G140*$E$7 | =(($E$5*E140)+($E$6*F140)+($E$7*G140)) |
| 141 | =E141*$E$5 | =F141*$E$6 | =G141*$E$7 | =(($E$5*E141)+($E$6*F141)+($E$7*G141)) |
| 142 | =E142*$E$5 | =F142*$E$6 | =G142*$E$7 | =(($E$5*E142)+($E$6*F142)+($E$7*G142)) |
| 143 | =E143*$E$5 | =F143*$E$6 | =G143*$E$7 | =(($E$5*E143)+($E$6*F143)+($E$7*G143)) |
| 144 | =E144*$E$5 | =F144*$E$6 | =G144*$E$7 | =(($E$5*E144)+($E$6*F144)+($E$7*G144)) |
| 145 | =E145*$E$5 | =F145*$E$6 | =G145*$E$7 | =(($E$5*E145)+($E$6*F145)+($E$7*G145)) |
| 146 | =E146*$E$5 | =F146*$E$6 | =G146*$E$7 | =(($E$5*E146)+($E$6*F146)+($E$7*G146)) |
| 147 | =E147*$E$5 | =F147*$E$6 | =G147*$E$7 | =(($E$5*E147)+($E$6*F147)+($E$7*G147)) |
| 148 | =E148*$E$5 | =F148*$E$6 | =G148*$E$7 | =(($E$5*E148)+($E$6*F148)+($E$7*G148)) |
| 149 | =E149*$E$5 | =F149*$E$6 | =G149*$E$7 | =(($E$5*E149)+($E$6*F149)+($E$7*G149)) |
| 150 | =E150*$E$5 | =F150*$E$6 | =G150*$E$7 | =(($E$5*E150)+($E$6*F150)+($E$7*G150)) |
| 151 | =E151*$E$5 | =F151*$E$6 | =G151*$E$7 | =(($E$5*E151)+($E$6*F151)+($E$7*G151)) |
| 152 | =E152*$E$5 | =F152*$E$6 | =G152*$E$7 | =(($E$5*E152)+($E$6*F152)+($E$7*G152)) |
| 153 | =E153*$E$5 | =F153*$E$6 | =G153*$E$7 | =(($E$5*E153)+($E$6*F153)+($E$7*G153)) |
| 154 | =E154*$E$5 | =F154*$E$6 | =G154*$E$7 | =(($E$5*E154)+($E$6*F154)+($E$7*G154)) |
| 155 | =E155*$E$5 | =F155*$E$6 | =G155*$E$7 | =(($E$5*E155)+($E$6*F155)+($E$7*G155)) |
| 156 | =E156*$E$5 | =F156*$E$6 | =G156*$E$7 | =(($E$5*E156)+($E$6*F156)+($E$7*G156)) |
| 157 | =E157*$E$5 | =F157*$E$6 | =G157*$E$7 | =(($E$5*E157)+($E$6*F157)+($E$7*G157)) |
| 158 | =E158*$E$5 | =F158*$E$6 | =G158*$E$7 | =(($E$5*E158)+($E$6*F158)+($E$7*G158)) |
| 159 | =E159*$E$5 | =F159*$E$6 | =G159*$E$7 | =(($E$5*E159)+($E$6*F159)+($E$7*G159)) |
| 160 | =E160*$E$5 | =F160*$E$6 | =G160*$E$7 | =(($E$5*E160)+($E$6*F160)+($E$7*G160)) |
| 161 | =E161*$E$5 | =F161*$E$6 | =G161*$E$7 | =(($E$5*E161)+($E$6*F161)+($E$7*G161)) |
| 162 | =E162*$E$5 | =F162*$E$6 | =G162*$E$7 | =(($E$5*E162)+($E$6*F162)+($E$7*G162)) |
| 163 | =E163*$E$5 | =F163*$E$6 | =G163*$E$7 | =(($E$5*E163)+($E$6*F163)+($E$7*G163)) |

FIG. 33

|     | H | I | J | K |
|-----|---|---|---|---|
| 164 | =E164*$E$5 | =F164*$E$6 | =G164*$E$7 | =(($E$5*E164)+($E$6*F164)+($E$7*G164)) |
| 165 | =E165*$E$5 | =F165*$E$6 | =G165*$E$7 | =(($E$5*E165)+($E$6*F165)+($E$7*G165)) |
| 166 | =E166*$E$5 | =F166*$E$6 | =G166*$E$7 | =(($E$5*E166)+($E$6*F166)+($E$7*G166)) |
| 167 | =E167*$E$5 | =F167*$E$6 | =G167*$E$7 | =(($E$5*E167)+($E$6*F167)+($E$7*G167)) |
| 168 | =E168*$E$5 | =F168*$E$6 | =G168*$E$7 | =(($E$5*E168)+($E$6*F168)+($E$7*G168)) |
| 169 | =E169*$E$5 | =F169*$E$6 | =G169*$E$7 | =(($E$5*E169)+($E$6*F169)+($E$7*G169)) |
| 170 | =E170*$E$5 | =F170*$E$6 | =G170*$E$7 | =(($E$5*E170)+($E$6*F170)+($E$7*G170)) |
| 171 | =E171*$E$5 | =F171*$E$6 | =G171*$E$7 | =(($E$5*E171)+($E$6*F171)+($E$7*G171)) |
| 172 | =E172*$E$5 | =F172*$E$6 | =G172*$E$7 | =(($E$5*E172)+($E$6*F172)+($E$7*G172)) |
| 173 | =E173*$E$5 | =F173*$E$6 | =G173*$E$7 | =(($E$5*E173)+($E$6*F173)+($E$7*G173)) |
| 174 | =E174*$E$5 | =F174*$E$6 | =G174*$E$7 | =(($E$5*E174)+($E$6*F174)+($E$7*G174)) |
| 175 | =E175*$E$5 | =F175*$E$6 | =G175*$E$7 | =(($E$5*E175)+($E$6*F175)+($E$7*G175)) |
| 176 | =E176*$E$5 | =F176*$E$6 | =G176*$E$7 | =(($E$5*E176)+($E$6*F176)+($E$7*G176)) |
| 177 | =E177*$E$5 | =F177*$E$6 | =G177*$E$7 | =(($E$5*E177)+($E$6*F177)+($E$7*G177)) |
| 178 | =E178*$E$5 | =F178*$E$6 | =G178*$E$7 | =(($E$5*E178)+($E$6*F178)+($E$7*G178)) |
| 179 | =E179*$E$5 | =F179*$E$6 | =G179*$E$7 | =(($E$5*E179)+($E$6*F179)+($E$7*G179)) |
| 180 | =E180*$E$5 | =F180*$E$6 | =G180*$E$7 | =(($E$5*E180)+($E$6*F180)+($E$7*G180)) |
| 181 | =E181*$E$5 | =F181*$E$6 | =G181*$E$7 | =(($E$5*E181)+($E$6*F181)+($E$7*G181)) |
| 182 | =E182*$E$5 | =F182*$E$6 | =G182*$E$7 | =(($E$5*E182)+($E$6*F182)+($E$7*G182)) |
| 183 | =E183*$E$5 | =F183*$E$6 | =G183*$E$7 | =(($E$5*E183)+($E$6*F183)+($E$7*G183)) |
| 184 | =E184*$E$5 | =F184*$E$6 | =G184*$E$7 | =(($E$5*E184)+($E$6*F184)+($E$7*G184)) |
| 185 | =E185*$E$5 | =F185*$E$6 | =G185*$E$7 | =(($E$5*E185)+($E$6*F185)+($E$7*G185)) |
| 186 | =E186*$E$5 | =F186*$E$6 | =G186*$E$7 | =(($E$5*E186)+($E$6*F186)+($E$7*G186)) |
| 187 | =E187*$E$5 | =F187*$E$6 | =G187*$E$7 | =(($E$5*E187)+($E$6*F187)+($E$7*G187)) |
| 188 | =E188*$E$5 | =F188*$E$6 | =G188*$E$7 | =(($E$5*E188)+($E$6*F188)+($E$7*G188)) |
| 189 | =E189*$E$5 | =F189*$E$6 | =G189*$E$7 | =(($E$5*E189)+($E$6*F189)+($E$7*G189)) |
| 190 | =E190*$E$5 | =F190*$E$6 | =G190*$E$7 | =(($E$5*E190)+($E$6*F190)+($E$7*G190)) |

FIG. 34

| | L | M | N | O | P |
|---|---|---|---|---|---|
| 36 | Spectral Emissions for Graph | | | | |
| 37 | Normalized | | | | |
| 38 | | | | | |
| 39 | Wavelength | | | | |
| 40 | 400 | =H40/MAX($H$40:$K$190) | =I40/MAX($H$40:$K$190) | =J40/MAX($H$40:$K$190) | =K40/MAX($H$40:$K$190) |
| 41 | =L40+2 | =H41/MAX($H$40:$K$190) | =I41/MAX($H$40:$K$190) | =J41/MAX($H$40:$K$190) | =K41/MAX($H$40:$K$190) |
| 42 | =L41+2 | =H42/MAX($H$40:$K$190) | =I42/MAX($H$40:$K$190) | =J42/MAX($H$40:$K$190) | =K42/MAX($H$40:$K$190) |
| 43 | =L42+2 | =H43/MAX($H$40:$K$190) | =I43/MAX($H$40:$K$190) | =J43/MAX($H$40:$K$190) | =K43/MAX($H$40:$K$190) |
| 44 | =L43+2 | =H44/MAX($H$40:$K$190) | =I44/MAX($H$40:$K$190) | =J44/MAX($H$40:$K$190) | =K44/MAX($H$40:$K$190) |
| 45 | =L44+2 | =H45/MAX($H$40:$K$190) | =I45/MAX($H$40:$K$190) | =J45/MAX($H$40:$K$190) | =K45/MAX($H$40:$K$190) |
| 46 | =L45+2 | =H46/MAX($H$40:$K$190) | =I46/MAX($H$40:$K$190) | =J46/MAX($H$40:$K$190) | =K46/MAX($H$40:$K$190) |
| 47 | =L46+2 | =H47/MAX($H$40:$K$190) | =I47/MAX($H$40:$K$190) | =J47/MAX($H$40:$K$190) | =K47/MAX($H$40:$K$190) |
| 48 | =L47+2 | =H48/MAX($H$40:$K$190) | =I48/MAX($H$40:$K$190) | =J48/MAX($H$40:$K$190) | =K48/MAX($H$40:$K$190) |
| 49 | =L48+2 | =H49/MAX($H$40:$K$190) | =I49/MAX($H$40:$K$190) | =J49/MAX($H$40:$K$190) | =K49/MAX($H$40:$K$190) |
| 50 | =L49+2 | =H50/MAX($H$40:$K$190) | =I50/MAX($H$40:$K$190) | =J50/MAX($H$40:$K$190) | =K50/MAX($H$40:$K$190) |
| 51 | =L50+2 | =H51/MAX($H$40:$K$190) | =I51/MAX($H$40:$K$190) | =J51/MAX($H$40:$K$190) | =K51/MAX($H$40:$K$190) |
| 52 | =L51+2 | =H52/MAX($H$40:$K$190) | =I52/MAX($H$40:$K$190) | =J52/MAX($H$40:$K$190) | =K52/MAX($H$40:$K$190) |
| 53 | =L52+2 | =H53/MAX($H$40:$K$190) | =I53/MAX($H$40:$K$190) | =J53/MAX($H$40:$K$190) | =K53/MAX($H$40:$K$190) |
| 54 | =L53+2 | =H54/MAX($H$40:$K$190) | =I54/MAX($H$40:$K$190) | =J54/MAX($H$40:$K$190) | =K54/MAX($H$40:$K$190) |
| 55 | =L54+2 | =H55/MAX($H$40:$K$190) | =I55/MAX($H$40:$K$190) | =J55/MAX($H$40:$K$190) | =K55/MAX($H$40:$K$190) |
| 56 | =L55+2 | =H56/MAX($H$40:$K$190) | =I56/MAX($H$40:$K$190) | =J56/MAX($H$40:$K$190) | =K56/MAX($H$40:$K$190) |
| 57 | =L56+2 | =H57/MAX($H$40:$K$190) | =I57/MAX($H$40:$K$190) | =J57/MAX($H$40:$K$190) | =K57/MAX($H$40:$K$190) |
| 58 | =L57+2 | =H58/MAX($H$40:$K$190) | =I58/MAX($H$40:$K$190) | =J58/MAX($H$40:$K$190) | =K58/MAX($H$40:$K$190) |
| 59 | =L58+2 | =H59/MAX($H$40:$K$190) | =I59/MAX($H$40:$K$190) | =J59/MAX($H$40:$K$190) | =K59/MAX($H$40:$K$190) |
| 60 | =L59+2 | =H60/MAX($H$40:$K$190) | =I60/MAX($H$40:$K$190) | =J60/MAX($H$40:$K$190) | =K60/MAX($H$40:$K$190) |
| 61 | =L60+2 | =H61/MAX($H$40:$K$190) | =I61/MAX($H$40:$K$190) | =J61/MAX($H$40:$K$190) | =K61/MAX($H$40:$K$190) |
| 62 | =L61+2 | =H62/MAX($H$40:$K$190) | =I62/MAX($H$40:$K$190) | =J62/MAX($H$40:$K$190) | =K62/MAX($H$40:$K$190) |
| 63 | =L62+2 | =H63/MAX($H$40:$K$190) | =I63/MAX($H$40:$K$190) | =J63/MAX($H$40:$K$190) | =K63/MAX($H$40:$K$190) |
| 64 | =L63+2 | =H64/MAX($H$40:$K$190) | =I64/MAX($H$40:$K$190) | =J64/MAX($H$40:$K$190) | =K64/MAX($H$40:$K$190) |

FIG. 35

|    | L       | M                          | N                          | O                          | P                          |
|----|---------|----------------------------|----------------------------|----------------------------|----------------------------|
| 65 | =L64+2  | =H65/MAX($H$40:$K$190)     | =I65/MAX($H$40:$K$190)     | =J65/MAX($H$40:$K$190)     | =K65/MAX($H$40:$K$190)     |
| 66 | =L65+2  | =H66/MAX($H$40:$K$190)     | =I66/MAX($H$40:$K$190)     | =J66/MAX($H$40:$K$190)     | =K66/MAX($H$40:$K$190)     |
| 67 | =L66+2  | =H67/MAX($H$40:$K$190)     | =I67/MAX($H$40:$K$190)     | =J67/MAX($H$40:$K$190)     | =K67/MAX($H$40:$K$190)     |
| 68 | =L67+2  | =H68/MAX($H$40:$K$190)     | =I68/MAX($H$40:$K$190)     | =J68/MAX($H$40:$K$190)     | =K68/MAX($H$40:$K$190)     |
| 69 | =L68+2  | =H69/MAX($H$40:$K$190)     | =I69/MAX($H$40:$K$190)     | =J69/MAX($H$40:$K$190)     | =K69/MAX($H$40:$K$190)     |
| 70 | =L69+2  | =H70/MAX($H$40:$K$190)     | =I70/MAX($H$40:$K$190)     | =J70/MAX($H$40:$K$190)     | =K70/MAX($H$40:$K$190)     |
| 71 | =L70+2  | =H71/MAX($H$40:$K$190)     | =I71/MAX($H$40:$K$190)     | =J71/MAX($H$40:$K$190)     | =K71/MAX($H$40:$K$190)     |
| 72 | =L71+2  | =H72/MAX($H$40:$K$190)     | =I72/MAX($H$40:$K$190)     | =J72/MAX($H$40:$K$190)     | =K72/MAX($H$40:$K$190)     |
| 73 | =L72+2  | =H73/MAX($H$40:$K$190)     | =I73/MAX($H$40:$K$190)     | =J73/MAX($H$40:$K$190)     | =K73/MAX($H$40:$K$190)     |
| 74 | =L73+2  | =H74/MAX($H$40:$K$190)     | =I74/MAX($H$40:$K$190)     | =J74/MAX($H$40:$K$190)     | =K74/MAX($H$40:$K$190)     |
| 75 | =L74+2  | =H75/MAX($H$40:$K$190)     | =I75/MAX($H$40:$K$190)     | =J75/MAX($H$40:$K$190)     | =K75/MAX($H$40:$K$190)     |
| 76 | =L75+2  | =H76/MAX($H$40:$K$190)     | =I76/MAX($H$40:$K$190)     | =J76/MAX($H$40:$K$190)     | =K76/MAX($H$40:$K$190)     |
| 77 | =L76+2  | =H77/MAX($H$40:$K$190)     | =I77/MAX($H$40:$K$190)     | =J77/MAX($H$40:$K$190)     | =K77/MAX($H$40:$K$190)     |
| 78 | =L77+2  | =H78/MAX($H$40:$K$190)     | =I78/MAX($H$40:$K$190)     | =J78/MAX($H$40:$K$190)     | =K78/MAX($H$40:$K$190)     |
| 79 | =L78+2  | =H79/MAX($H$40:$K$190)     | =I79/MAX($H$40:$K$190)     | =J79/MAX($H$40:$K$190)     | =K79/MAX($H$40:$K$190)     |
| 80 | =L79+2  | =H80/MAX($H$40:$K$190)     | =I80/MAX($H$40:$K$190)     | =J80/MAX($H$40:$K$190)     | =K80/MAX($H$40:$K$190)     |
| 81 | =L80+2  | =H81/MAX($H$40:$K$190)     | =I81/MAX($H$40:$K$190)     | =J81/MAX($H$40:$K$190)     | =K81/MAX($H$40:$K$190)     |
| 82 | =L81+2  | =H82/MAX($H$40:$K$190)     | =I82/MAX($H$40:$K$190)     | =J82/MAX($H$40:$K$190)     | =K82/MAX($H$40:$K$190)     |
| 83 | =L82+2  | =H83/MAX($H$40:$K$190)     | =I83/MAX($H$40:$K$190)     | =J83/MAX($H$40:$K$190)     | =K83/MAX($H$40:$K$190)     |
| 84 | =L83+2  | =H84/MAX($H$40:$K$190)     | =I84/MAX($H$40:$K$190)     | =J84/MAX($H$40:$K$190)     | =K84/MAX($H$40:$K$190)     |
| 85 | =L84+2  | =H85/MAX($H$40:$K$190)     | =I85/MAX($H$40:$K$190)     | =J85/MAX($H$40:$K$190)     | =K85/MAX($H$40:$K$190)     |
| 86 | =L85+2  | =H86/MAX($H$40:$K$190)     | =I86/MAX($H$40:$K$190)     | =J86/MAX($H$40:$K$190)     | =K86/MAX($H$40:$K$190)     |
| 87 | =L86+2  | =H87/MAX($H$40:$K$190)     | =I87/MAX($H$40:$K$190)     | =J87/MAX($H$40:$K$190)     | =K87/MAX($H$40:$K$190)     |
| 88 | =L87+2  | =H88/MAX($H$40:$K$190)     | =I88/MAX($H$40:$K$190)     | =J88/MAX($H$40:$K$190)     | =K88/MAX($H$40:$K$190)     |
| 89 | =L88+2  | =H89/MAX($H$40:$K$190)     | =I89/MAX($H$40:$K$190)     | =J89/MAX($H$40:$K$190)     | =K89/MAX($H$40:$K$190)     |
| 90 | =L89+2  | =H90/MAX($H$40:$K$190)     | =I90/MAX($H$40:$K$190)     | =J90/MAX($H$40:$K$190)     | =K90/MAX($H$40:$K$190)     |
| 91 | =L90+2  | =H91/MAX($H$40:$K$190)     | =I91/MAX($H$40:$K$190)     | =J91/MAX($H$40:$K$190)     | =K91/MAX($H$40:$K$190)     |
| 92 | =L91+2  | =H92/MAX($H$40:$K$190)     | =I92/MAX($H$40:$K$190)     | =J92/MAX($H$40:$K$190)     | =K92/MAX($H$40:$K$190)     |
| 93 | =L92+2  | =H93/MAX($H$40:$K$190)     | =I93/MAX($H$40:$K$190)     | =J93/MAX($H$40:$K$190)     | =K93/MAX($H$40:$K$190)     |

FIG. 36

| | L | M | N | O | P |
|---|---|---|---|---|---|
| 94 | =L93+2 | =H94/MAX($H$40:$K$190) | =I94/MAX($H$40:$K$190) | =J94/MAX($H$40:$K$190) | =K94/MAX($H$40:$K$190) |
| 95 | =L94+2 | =H95/MAX($H$40:$K$190) | =I95/MAX($H$40:$K$190) | =J95/MAX($H$40:$K$190) | =K95/MAX($H$40:$K$190) |
| 96 | =L95+2 | =H96/MAX($H$40:$K$190) | =I96/MAX($H$40:$K$190) | =J96/MAX($H$40:$K$190) | =K96/MAX($H$40:$K$190) |
| 97 | =L96+2 | =H97/MAX($H$40:$K$190) | =I97/MAX($H$40:$K$190) | =J97/MAX($H$40:$K$190) | =K97/MAX($H$40:$K$190) |
| 98 | =L97+2 | =H98/MAX($H$40:$K$190) | =I98/MAX($H$40:$K$190) | =J98/MAX($H$40:$K$190) | =K98/MAX($H$40:$K$190) |
| 99 | =L98+2 | =H99/MAX($H$40:$K$190) | =I99/MAX($H$40:$K$190) | =J99/MAX($H$40:$K$190) | =K99/MAX($H$40:$K$190) |
| 100 | =L99+2 | =H100/MAX($H$40:$K$190) | =I100/MAX($H$40:$K$190) | =J100/MAX($H$40:$K$190) | =K100/MAX($H$40:$K$190) |
| 101 | =L100+2 | =H101/MAX($H$40:$K$190) | =I101/MAX($H$40:$K$190) | =J101/MAX($H$40:$K$190) | =K101/MAX($H$40:$K$190) |
| 102 | =L101+2 | =H102/MAX($H$40:$K$190) | =I102/MAX($H$40:$K$190) | =J102/MAX($H$40:$K$190) | =K102/MAX($H$40:$K$190) |
| 103 | =L102+2 | =H103/MAX($H$40:$K$190) | =I103/MAX($H$40:$K$190) | =J103/MAX($H$40:$K$190) | =K103/MAX($H$40:$K$190) |
| 104 | =L103+2 | =H104/MAX($H$40:$K$190) | =I104/MAX($H$40:$K$190) | =J104/MAX($H$40:$K$190) | =K104/MAX($H$40:$K$190) |
| 105 | =L104+2 | =H105/MAX($H$40:$K$190) | =I105/MAX($H$40:$K$190) | =J105/MAX($H$40:$K$190) | =K105/MAX($H$40:$K$190) |
| 106 | =L105+2 | =H106/MAX($H$40:$K$190) | =I106/MAX($H$40:$K$190) | =J106/MAX($H$40:$K$190) | =K106/MAX($H$40:$K$190) |
| 107 | =L106+2 | =H107/MAX($H$40:$K$190) | =I107/MAX($H$40:$K$190) | =J107/MAX($H$40:$K$190) | =K107/MAX($H$40:$K$190) |
| 108 | =L107+2 | =H108/MAX($H$40:$K$190) | =I108/MAX($H$40:$K$190) | =J108/MAX($H$40:$K$190) | =K108/MAX($H$40:$K$190) |
| 109 | =L108+2 | =H109/MAX($H$40:$K$190) | =I109/MAX($H$40:$K$190) | =J109/MAX($H$40:$K$190) | =K109/MAX($H$40:$K$190) |
| 110 | =L109+2 | =H110/MAX($H$40:$K$190) | =I110/MAX($H$40:$K$190) | =J110/MAX($H$40:$K$190) | =K110/MAX($H$40:$K$190) |
| 111 | =L110+2 | =H111/MAX($H$40:$K$190) | =I111/MAX($H$40:$K$190) | =J111/MAX($H$40:$K$190) | =K111/MAX($H$40:$K$190) |
| 112 | =L111+2 | =H112/MAX($H$40:$K$190) | =I112/MAX($H$40:$K$190) | =J112/MAX($H$40:$K$190) | =K112/MAX($H$40:$K$190) |
| 113 | =L112+2 | =H113/MAX($H$40:$K$190) | =I113/MAX($H$40:$K$190) | =J113/MAX($H$40:$K$190) | =K113/MAX($H$40:$K$190) |
| 114 | =L113+2 | =H114/MAX($H$40:$K$190) | =I114/MAX($H$40:$K$190) | =J114/MAX($H$40:$K$190) | =K114/MAX($H$40:$K$190) |
| 115 | =L114+2 | =H115/MAX($H$40:$K$190) | =I115/MAX($H$40:$K$190) | =J115/MAX($H$40:$K$190) | =K115/MAX($H$40:$K$190) |
| 116 | =L115+2 | =H116/MAX($H$40:$K$190) | =I116/MAX($H$40:$K$190) | =J116/MAX($H$40:$K$190) | =K116/MAX($H$40:$K$190) |
| 117 | =L116+2 | =H117/MAX($H$40:$K$190) | =I117/MAX($H$40:$K$190) | =J117/MAX($H$40:$K$190) | =K117/MAX($H$40:$K$190) |
| 118 | =L117+2 | =H118/MAX($H$40:$K$190) | =I118/MAX($H$40:$K$190) | =J118/MAX($H$40:$K$190) | =K118/MAX($H$40:$K$190) |
| 119 | =L118+2 | =H119/MAX($H$40:$K$190) | =I119/MAX($H$40:$K$190) | =J119/MAX($H$40:$K$190) | =K119/MAX($H$40:$K$190) |
| 120 | =L119+2 | =H120/MAX($H$40:$K$190) | =I120/MAX($H$40:$K$190) | =J120/MAX($H$40:$K$190) | =K120/MAX($H$40:$K$190) |
| 121 | =L120+2 | =H121/MAX($H$40:$K$190) | =I121/MAX($H$40:$K$190) | =J121/MAX($H$40:$K$190) | =K121/MAX($H$40:$K$190) |

FIG. 37

| | L | M | N | O | P |
|---|---|---|---|---|---|
| 122 | =L121+2 | =H122/MAX($H$40:$K$190) | =I122/MAX($H$40:$K$190) | =J122/MAX($H$40:$K$190) | =K122/MAX($H$40:$K$190) |
| 123 | =L122+2 | =H123/MAX($H$40:$K$190) | =I123/MAX($H$40:$K$190) | =J123/MAX($H$40:$K$190) | =K123/MAX($H$40:$K$190) |
| 124 | =L123+2 | =H124/MAX($H$40:$K$190) | =I124/MAX($H$40:$K$190) | =J124/MAX($H$40:$K$190) | =K124/MAX($H$40:$K$190) |
| 125 | =L124+2 | =H125/MAX($H$40:$K$190) | =I125/MAX($H$40:$K$190) | =J125/MAX($H$40:$K$190) | =K125/MAX($H$40:$K$190) |
| 126 | =L125+2 | =H126/MAX($H$40:$K$190) | =I126/MAX($H$40:$K$190) | =J126/MAX($H$40:$K$190) | =K126/MAX($H$40:$K$190) |
| 127 | =L126+2 | =H127/MAX($H$40:$K$190) | =I127/MAX($H$40:$K$190) | =J127/MAX($H$40:$K$190) | =K127/MAX($H$40:$K$190) |
| 128 | =L127+2 | =H128/MAX($H$40:$K$190) | =I128/MAX($H$40:$K$190) | =J128/MAX($H$40:$K$190) | =K128/MAX($H$40:$K$190) |
| 129 | =L128+2 | =H129/MAX($H$40:$K$190) | =I129/MAX($H$40:$K$190) | =J129/MAX($H$40:$K$190) | =K129/MAX($H$40:$K$190) |
| 130 | =L129+2 | =H130/MAX($H$40:$K$190) | =I130/MAX($H$40:$K$190) | =J130/MAX($H$40:$K$190) | =K130/MAX($H$40:$K$190) |
| 131 | =L130+2 | =H131/MAX($H$40:$K$190) | =I131/MAX($H$40:$K$190) | =J131/MAX($H$40:$K$190) | =K131/MAX($H$40:$K$190) |
| 132 | =L131+2 | =H132/MAX($H$40:$K$190) | =I132/MAX($H$40:$K$190) | =J132/MAX($H$40:$K$190) | =K132/MAX($H$40:$K$190) |
| 133 | =L132+2 | =H133/MAX($H$40:$K$190) | =I133/MAX($H$40:$K$190) | =J133/MAX($H$40:$K$190) | =K133/MAX($H$40:$K$190) |
| 134 | =L133+2 | =H134/MAX($H$40:$K$190) | =I134/MAX($H$40:$K$190) | =J134/MAX($H$40:$K$190) | =K134/MAX($H$40:$K$190) |
| 135 | =L134+2 | =H135/MAX($H$40:$K$190) | =I135/MAX($H$40:$K$190) | =J135/MAX($H$40:$K$190) | =K135/MAX($H$40:$K$190) |
| 136 | =L135+2 | =H136/MAX($H$40:$K$190) | =I136/MAX($H$40:$K$190) | =J136/MAX($H$40:$K$190) | =K136/MAX($H$40:$K$190) |
| 137 | =L136+2 | =H137/MAX($H$40:$K$190) | =I137/MAX($H$40:$K$190) | =J137/MAX($H$40:$K$190) | =K137/MAX($H$40:$K$190) |
| 138 | =L137+2 | =H138/MAX($H$40:$K$190) | =I138/MAX($H$40:$K$190) | =J138/MAX($H$40:$K$190) | =K138/MAX($H$40:$K$190) |
| 139 | =L138+2 | =H139/MAX($H$40:$K$190) | =I139/MAX($H$40:$K$190) | =J139/MAX($H$40:$K$190) | =K139/MAX($H$40:$K$190) |
| 140 | =L139+2 | =H140/MAX($H$40:$K$190) | =I140/MAX($H$40:$K$190) | =J140/MAX($H$40:$K$190) | =K140/MAX($H$40:$K$190) |
| 141 | =L140+2 | =H141/MAX($H$40:$K$190) | =I141/MAX($H$40:$K$190) | =J141/MAX($H$40:$K$190) | =K141/MAX($H$40:$K$190) |
| 142 | =L141+2 | =H142/MAX($H$40:$K$190) | =I142/MAX($H$40:$K$190) | =J142/MAX($H$40:$K$190) | =K142/MAX($H$40:$K$190) |
| 143 | =L142+2 | =H143/MAX($H$40:$K$190) | =I143/MAX($H$40:$K$190) | =J143/MAX($H$40:$K$190) | =K143/MAX($H$40:$K$190) |
| 144 | =L143+2 | =H144/MAX($H$40:$K$190) | =I144/MAX($H$40:$K$190) | =J144/MAX($H$40:$K$190) | =K144/MAX($H$40:$K$190) |
| 145 | =L144+2 | =H145/MAX($H$40:$K$190) | =I145/MAX($H$40:$K$190) | =J145/MAX($H$40:$K$190) | =K145/MAX($H$40:$K$190) |
| 146 | =L145+2 | =H146/MAX($H$40:$K$190) | =I146/MAX($H$40:$K$190) | =J146/MAX($H$40:$K$190) | =K146/MAX($H$40:$K$190) |
| 147 | =L146+2 | =H147/MAX($H$40:$K$190) | =I147/MAX($H$40:$K$190) | =J147/MAX($H$40:$K$190) | =K147/MAX($H$40:$K$190) |
| 148 | =L147+2 | =H148/MAX($H$40:$K$190) | =I148/MAX($H$40:$K$190) | =J148/MAX($H$40:$K$190) | =K148/MAX($H$40:$K$190) |
| 149 | =L148+2 | =H149/MAX($H$40:$K$190) | =I149/MAX($H$40:$K$190) | =J149/MAX($H$40:$K$190) | =K149/MAX($H$40:$K$190) |
| 150 | =L149+2 | =H150/MAX($H$40:$K$190) | =I150/MAX($H$40:$K$190) | =J150/MAX($H$40:$K$190) | =K150/MAX($H$40:$K$190) |

FIG. 38

| | L | M | N | O | P |
|---|---|---|---|---|---|
| 151 | =L150+2 | =H151/MAX($H$40:$K$190) | =I151/MAX($H$40:$K$190) | =J151/MAX($H$40:$K$190) | =K151/MAX($H$40:$K$190) |
| 152 | =L151+2 | =H152/MAX($H$40:$K$190) | =I152/MAX($H$40:$K$190) | =J152/MAX($H$40:$K$190) | =K152/MAX($H$40:$K$190) |
| 153 | =L152+2 | =H153/MAX($H$40:$K$190) | =I153/MAX($H$40:$K$190) | =J153/MAX($H$40:$K$190) | =K153/MAX($H$40:$K$190) |
| 154 | =L153+2 | =H154/MAX($H$40:$K$190) | =I154/MAX($H$40:$K$190) | =J154/MAX($H$40:$K$190) | =K154/MAX($H$40:$K$190) |
| 155 | =L154+2 | =H155/MAX($H$40:$K$190) | =I155/MAX($H$40:$K$190) | =J155/MAX($H$40:$K$190) | =K155/MAX($H$40:$K$190) |
| 156 | =L155+2 | =H156/MAX($H$40:$K$190) | =I156/MAX($H$40:$K$190) | =J156/MAX($H$40:$K$190) | =K156/MAX($H$40:$K$190) |
| 157 | =L156+2 | =H157/MAX($H$40:$K$190) | =I157/MAX($H$40:$K$190) | =J157/MAX($H$40:$K$190) | =K157/MAX($H$40:$K$190) |
| 158 | =L157+2 | =H158/MAX($H$40:$K$190) | =I158/MAX($H$40:$K$190) | =J158/MAX($H$40:$K$190) | =K158/MAX($H$40:$K$190) |
| 159 | =L158+2 | =H159/MAX($H$40:$K$190) | =I159/MAX($H$40:$K$190) | =J159/MAX($H$40:$K$190) | =K159/MAX($H$40:$K$190) |
| 160 | =L159+2 | =H160/MAX($H$40:$K$190) | =I160/MAX($H$40:$K$190) | =J160/MAX($H$40:$K$190) | =K160/MAX($H$40:$K$190) |
| 161 | =L160+2 | =H161/MAX($H$40:$K$190) | =I161/MAX($H$40:$K$190) | =J161/MAX($H$40:$K$190) | =K161/MAX($H$40:$K$190) |
| 162 | =L161+2 | =H162/MAX($H$40:$K$190) | =I162/MAX($H$40:$K$190) | =J162/MAX($H$40:$K$190) | =K162/MAX($H$40:$K$190) |
| 163 | =L162+2 | =H163/MAX($H$40:$K$190) | =I163/MAX($H$40:$K$190) | =J163/MAX($H$40:$K$190) | =K163/MAX($H$40:$K$190) |
| 164 | =L163+2 | =H164/MAX($H$40:$K$190) | =I164/MAX($H$40:$K$190) | =J164/MAX($H$40:$K$190) | =K164/MAX($H$40:$K$190) |
| 165 | =L164+2 | =H165/MAX($H$40:$K$190) | =I165/MAX($H$40:$K$190) | =J165/MAX($H$40:$K$190) | =K165/MAX($H$40:$K$190) |
| 166 | =L165+2 | =H166/MAX($H$40:$K$190) | =I166/MAX($H$40:$K$190) | =J166/MAX($H$40:$K$190) | =K166/MAX($H$40:$K$190) |
| 167 | =L166+2 | =H167/MAX($H$40:$K$190) | =I167/MAX($H$40:$K$190) | =J167/MAX($H$40:$K$190) | =K167/MAX($H$40:$K$190) |
| 168 | =L167+2 | =H168/MAX($H$40:$K$190) | =I168/MAX($H$40:$K$190) | =J168/MAX($H$40:$K$190) | =K168/MAX($H$40:$K$190) |
| 169 | =L168+2 | =H169/MAX($H$40:$K$190) | =I169/MAX($H$40:$K$190) | =J169/MAX($H$40:$K$190) | =K169/MAX($H$40:$K$190) |
| 170 | =L169+2 | =H170/MAX($H$40:$K$190) | =I170/MAX($H$40:$K$190) | =J170/MAX($H$40:$K$190) | =K170/MAX($H$40:$K$190) |
| 171 | =L170+2 | =H171/MAX($H$40:$K$190) | =I171/MAX($H$40:$K$190) | =J171/MAX($H$40:$K$190) | =K171/MAX($H$40:$K$190) |
| 172 | =L171+2 | =H172/MAX($H$40:$K$190) | =I172/MAX($H$40:$K$190) | =J172/MAX($H$40:$K$190) | =K172/MAX($H$40:$K$190) |
| 173 | =L172+2 | =H173/MAX($H$40:$K$190) | =I173/MAX($H$40:$K$190) | =J173/MAX($H$40:$K$190) | =K173/MAX($H$40:$K$190) |
| 174 | =L173+2 | =H174/MAX($H$40:$K$190) | =I174/MAX($H$40:$K$190) | =J174/MAX($H$40:$K$190) | =K174/MAX($H$40:$K$190) |
| 175 | =L174+2 | =H175/MAX($H$40:$K$190) | =I175/MAX($H$40:$K$190) | =J175/MAX($H$40:$K$190) | =K175/MAX($H$40:$K$190) |
| 176 | =L175+2 | =H176/MAX($H$40:$K$190) | =I176/MAX($H$40:$K$190) | =J176/MAX($H$40:$K$190) | =K176/MAX($H$40:$K$190) |
| 177 | =L176+2 | =H177/MAX($H$40:$K$190) | =I177/MAX($H$40:$K$190) | =J177/MAX($H$40:$K$190) | =K177/MAX($H$40:$K$190) |
| 178 | =L177+2 | =H178/MAX($H$40:$K$190) | =I178/MAX($H$40:$K$190) | =J178/MAX($H$40:$K$190) | =K178/MAX($H$40:$K$190) |
| 179 | =L178+2 | =H179/MAX($H$40:$K$190) | =I179/MAX($H$40:$K$190) | =J179/MAX($H$40:$K$190) | =K179/MAX($H$40:$K$190) |

FIG. 39

| | L | M | N | O | P |
|---|---|---|---|---|---|
| 180 | =L179+2 | =H180/MAX($H$40:$K$190) | =I180/MAX($H$40:$K$190) | =J180/MAX($H$40:$K$190) | =K180/MAX($H$40:$K$190) |
| 181 | =L180+2 | =H181/MAX($H$40:$K$190) | =I181/MAX($H$40:$K$190) | =J181/MAX($H$40:$K$190) | =K181/MAX($H$40:$K$190) |
| 182 | =L181+2 | =H182/MAX($H$40:$K$190) | =I182/MAX($H$40:$K$190) | =J182/MAX($H$40:$K$190) | =K182/MAX($H$40:$K$190) |
| 183 | =L182+2 | =H183/MAX($H$40:$K$190) | =I183/MAX($H$40:$K$190) | =J183/MAX($H$40:$K$190) | =K183/MAX($H$40:$K$190) |
| 184 | =L183+2 | =H184/MAX($H$40:$K$190) | =I184/MAX($H$40:$K$190) | =J184/MAX($H$40:$K$190) | =K184/MAX($H$40:$K$190) |
| 185 | =L184+2 | =H185/MAX($H$40:$K$190) | =I185/MAX($H$40:$K$190) | =J185/MAX($H$40:$K$190) | =K185/MAX($H$40:$K$190) |
| 186 | =L185+2 | =H186/MAX($H$40:$K$190) | =I186/MAX($H$40:$K$190) | =J186/MAX($H$40:$K$190) | =K186/MAX($H$40:$K$190) |
| 187 | =L186+2 | =H187/MAX($H$40:$K$190) | =I187/MAX($H$40:$K$190) | =J187/MAX($H$40:$K$190) | =K187/MAX($H$40:$K$190) |
| 188 | =L187+2 | =H188/MAX($H$40:$K$190) | =I188/MAX($H$40:$K$190) | =J188/MAX($H$40:$K$190) | =K188/MAX($H$40:$K$190) |
| 189 | =L188+2 | =H189/MAX($H$40:$K$190) | =I189/MAX($H$40:$K$190) | =J189/MAX($H$40:$K$190) | =K189/MAX($H$40:$K$190) |
| 190 | =L189+2 | =H190/MAX($H$40:$K$190) | =I190/MAX($H$40:$K$190) | =J190/MAX($H$40:$K$190) | =K190/MAX($H$40:$K$190) |

FIG. 40

| | Q X-BAR | R Y-BAR | S Z-BAR |
|---|---|---|---|
| 36 | | | |
| 37 | | | |
| 38 | | | |
| 39 | | | |
| 40 | 1.43E-02 | 3.96E-04 | 6.79E-02 |
| 41 | 1.71E-02 | 4.73E-04 | 8.14E-02 |
| 42 | 2.07E-02 | 5.72E-04 | 9.85E-02 |
| 43 | 2.62E-02 | 7.25E-04 | 1.25E-01 |
| 44 | 3.39E-02 | 9.41E-04 | 1.61E-01 |
| 45 | 4.35E-02 | 1.21E-03 | 2.07E-01 |
| 46 | 5.50E-02 | 1.53E-03 | 2.62E-01 |
| 47 | 6.91E-02 | 1.94E-03 | 3.31E-01 |
| 48 | 8.70E-02 | 2.45E-03 | 4.16E-01 |
| 49 | 1.08E-01 | 3.12E-03 | 5.20E-01 |
| 50 | 1.34E-01 | 4.00E-03 | 6.46E-01 |
| 51 | 1.65E-01 | 5.16E-03 | 7.97E-01 |
| 52 | 1.99E-01 | 6.55E-03 | 9.59E-01 |
| 53 | 2.30E-01 | 8.09E-03 | 1.12E+00 |
| 54 | 2.59E-01 | 9.77E-03 | 1.26E+00 |
| 55 | 2.84E-01 | 1.16E-02 | 1.39E+00 |
| 56 | 3.05E-01 | 1.36E-02 | 1.49E+00 |
| 57 | 3.22E-01 | 1.57E-02 | 1.58E+00 |
| 58 | 3.34E-01 | 1.80E-02 | 1.66E+00 |
| 59 | 3.43E-01 | 2.05E-02 | 1.71E+00 |
| 60 | 3.48E-01 | 2.30E-02 | 1.75E+00 |
| 61 | 3.50E-01 | 2.56E-02 | 1.77E+00 |
| 62 | 3.49E-01 | 2.84E-02 | 1.78E+00 |
| 63 | 3.46E-01 | 3.13E-02 | 1.78E+00 |
| 64 | 3.42E-01 | 3.45E-02 | 1.78E+00 |

FIG. 41

| | Q | R | S |
|---|---|---|---|
| 65 | 3.36E-01 | 3.80E-02 | 1.77E+00 |
| 66 | 3.30E-01 | 4.18E-02 | 1.76E+00 |
| 67 | 3.23E-01 | 4.58E-02 | 1.75E+00 |
| 68 | 3.14E-01 | 5.02E-02 | 1.73E+00 |
| 69 | 3.03E-01 | 5.50E-02 | 1.71E+00 |
| 70 | 2.91E-01 | 6.00E-02 | 1.67E+00 |
| 71 | 2.77E-01 | 6.53E-02 | 1.62E+00 |
| 72 | 2.60E-01 | 7.09E-02 | 1.56E+00 |
| 73 | 2.41E-01 | 7.70E-02 | 1.49E+00 |
| 74 | 2.18E-01 | 8.37E-02 | 1.39E+00 |
| 75 | 1.95E-01 | 9.10E-02 | 1.29E+00 |
| 76 | 1.73E-01 | 9.90E-02 | 1.19E+00 |
| 77 | 1.52E-01 | 1.08E-01 | 1.09E+00 |
| 78 | 1.32E-01 | 1.18E-01 | 9.94E-01 |
| 79 | 1.13E-01 | 1.28E-01 | 9.01E-01 |
| 80 | 9.56E-02 | 1.39E-01 | 8.13E-01 |
| 81 | 7.93E-02 | 1.50E-01 | 7.29E-01 |
| 82 | 6.46E-02 | 1.63E-01 | 6.52E-01 |
| 83 | 5.19E-02 | 1.76E-01 | 5.82E-01 |
| 84 | 4.12E-02 | 1.91E-01 | 5.20E-01 |
| 85 | 3.20E-02 | 2.08E-01 | 4.65E-01 |
| 86 | 2.41E-02 | 2.27E-01 | 4.40E-01 |
| 87 | 1.75E-02 | 2.47E-01 | 3.73E-01 |
| 88 | 1.22E-02 | 2.70E-01 | 3.35E-01 |
| 89 | 7.97E-03 | 2.95E-01 | 3.01E-01 |
| 90 | 4.90E-03 | 3.23E-01 | 2.72E-01 |
| 91 | 2.95E-03 | 3.55E-01 | 2.46E-01 |
| 92 | 2.24E-03 | 3.89E-01 | 2.23E-01 |
| 93 | 2.93E-03 | 4.26E-01 | 2.01E-01 |

FIG. 42

| | Q | R | S |
|---|---|---|---|
| 94 | 5.17E-03 | 4.63E-01 | 1.79E-01 |
| 95 | 9.30E-03 | 5.03E-01 | 1.58E-01 |
| 96 | 1.55E-02 | 5.45E-01 | 1.38E-01 |
| 97 | 2.40E-02 | 5.87E-01 | 1.20E-01 |
| 98 | 3.98E-02 | 6.29E-01 | 1.04E-01 |
| 99 | 4.80E-02 | 6.71E-01 | 9.00E-02 |
| 100 | 6.33E-02 | 7.10E-01 | 7.82E-02 |
| 101 | 8.05E-02 | 7.45E-01 | 6.87E-02 |
| 102 | 9.95E-02 | 7.78E-01 | 6.08E-02 |
| 103 | 1.20E-01 | 8.08E-01 | 5.39E-02 |
| 104 | 1.42E-01 | 8.36E-01 | 4.78E-02 |
| 105 | 1.66E-01 | 8.62E-01 | 4.22E-02 |
| 106 | 1.89E-01 | 8.85E-01 | 3.69E-02 |
| 107 | 2.13E-01 | 9.05E-01 | 3.21E-02 |
| 108 | 2.38E-01 | 9.24E-01 | 2.77E-02 |
| 109 | 2.64E-01 | 9.40E-01 | 2.38E-02 |
| 110 | 2.90E-01 | 9.54E-01 | 2.03E-02 |
| 111 | 3.18E-01 | 9.66E-01 | 1.72E-02 |
| 112 | 3.45E-01 | 9.76E-01 | 1.46E-02 |
| 113 | 3.74E-01 | 9.84E-01 | 1.23E-02 |
| 114 | 4.03E-01 | 9.90E-01 | 1.04E-02 |
| 115 | 4.33E-01 | 9.95E-01 | 8.75E-03 |
| 116 | 4.64E-01 | 9.98E-01 | 7.38E-03 |
| 117 | 4.96E-01 | 1.00E+00 | 6.24E-03 |
| 118 | 5.28E-01 | 1.00E+00 | 5.30E-03 |
| 119 | 5.61E-01 | 9.98E-01 | 4.53E-03 |
| 120 | 5.95E-01 | 9.95E-01 | 3.90E-03 |
| 121 | 6.28E-01 | 9.90E-01 | 3.37E-03 |

FIG. 43

| | Q | R | S |
|---|---|---|---|
| 122 | 6.62E-01 | 9.83E-01 | 2.93E-03 |
| 123 | 6.95E-01 | 9.74E-01 | 2.59E-03 |
| 124 | 7.29E-01 | 9.64E-01 | 2.31E-03 |
| 125 | 7.62E-01 | 9.52E-01 | 2.10E-03 |
| 126 | 7.95E-01 | 9.38E-01 | 1.95E-03 |
| 127 | 8.27E-01 | 9.23E-01 | 1.84E-03 |
| 128 | 8.58E-01 | 9.07E-01 | 1.77E-03 |
| 129 | 8.88E-01 | 8.89E-01 | 1.71E-03 |
| 130 | 9.16E-01 | 8.70E-01 | 1.65E-03 |
| 131 | 9.43E-01 | 8.49E-01 | 1.56E-03 |
| 132 | 9.67E-01 | 8.28E-01 | 1.46E-03 |
| 133 | 9.89E-01 | 8.05E-01 | 1.34E-03 |
| 134 | 1.01E+00 | 7.81E-01 | 1.21E-03 |
| 135 | 1.03E+00 | 7.57E-01 | 1.10E-03 |
| 136 | 1.04E+00 | 7.32E-01 | 1.05E-03 |
| 137 | 1.05E+00 | 7.07E-01 | 1.02E-03 |
| 138 | 1.06E+00 | 6.82E-01 | 9.69E-04 |
| 139 | 1.06E+00 | 6.57E-01 | 8.87E-04 |
| 140 | 1.06E+00 | 6.31E-01 | 8.00E-04 |
| 141 | 1.06E+00 | 6.05E-01 | 7.24E-04 |
| 142 | 1.05E+00 | 5.80E-01 | 6.45E-04 |
| 143 | 1.04E+00 | 5.54E-01 | 5.48E-04 |
| 144 | 1.02E+00 | 5.28E-01 | 4.35E-04 |
| 145 | 1.00E+00 | 5.03E-01 | 3.40E-04 |
| 146 | 9.79E-01 | 4.78E-01 | 2.83E-04 |
| 147 | 9.53E-01 | 4.53E-01 | 2.52E-04 |
| 148 | 9.23E-01 | 4.29E-01 | 2.30E-04 |
| 149 | 8.91E-01 | 4.05E-01 | 2.12E-04 |
| 150 | 8.54E-01 | 3.81E-01 | 1.90E-04 |

FIG. 44

| | Q | R | S |
|---|---|---|---|
| 151 | 8.15E-01 | 3.57E-01 | 1.56E-04 |
| 152 | 7.73E-01 | 3.33E-01 | 1.17E-04 |
| 153 | 7.30E-01 | 3.09E-01 | 8.61E-05 |
| 154 | 6.86E-01 | 2.87E-01 | 6.50E-05 |
| 155 | 6.42E-01 | 2.65E-01 | 5.00E-05 |
| 156 | 6.01E-01 | 2.45E-01 | 3.95E-05 |
| 157 | 5.61E-01 | 2.26E-01 | 3.26E-05 |
| 158 | 5.23E-01 | 2.08E-01 | 2.77E-05 |
| 159 | 4.85E-01 | 1.91E-01 | 2.36E-05 |
| 160 | 4.48E-01 | 1.75E-01 | 2.00E-05 |
| 161 | 4.12E-01 | 1.60E-01 | 1.62E-05 |
| 162 | 3.78E-01 | 1.45E-01 | 1.21E-05 |
| 163 | 3.44E-01 | 1.32E-01 | 7.73E-06 |
| 164 | 3.13E-01 | 1.19E-01 | 3.20E-06 |
| 165 | 2.84E-01 | 1.07E-01 | 0.00E+00 |
| 166 | 2.56E-01 | 9.62E-02 | 0.00E+00 |
| 167 | 2.31E-01 | 8.63E-02 | 0.00E+00 |
| 168 | 2.07E-01 | 7.71E-02 | 0.00E+00 |
| 169 | 1.85E-01 | 6.87E-02 | 0.00E+00 |
| 170 | 1.65E-01 | 6.10E-02 | 0.00E+00 |
| 171 | 1.46E-01 | 5.40E-02 | 0.00E+00 |
| 172 | 1.29E-01 | 4.75E-02 | 0.00E+00 |
| 173 | 1.14E-01 | 4.18E-02 | 0.00E+00 |
| 174 | 9.97E-02 | 3.66E-02 | 0.00E+00 |
| 175 | 8.74E-02 | 3.20E-02 | 0.00E+00 |
| 176 | 7.68E-02 | 2.81E-02 | 0.00E+00 |
| 177 | 6.77E-02 | 2.47E-02 | 0.00E+00 |
| 178 | 5.98E-02 | 2.18E-02 | 0.00E+00 |
| 179 | 5.30E-02 | 1.93E-02 | 0.00E+00 |

FIG. 45

| | Q | R | S |
|---|---|---|---|
| 180 | 4.68E-02 | 1.70E-02 | 0.00E+00 |
| 181 | 4.09E-02 | 1.48E-02 | 0.00E+00 |
| 182 | 3.54E-02 | 1.28E-02 | 0.00E+00 |
| 183 | 3.06E-02 | 1.11E-02 | 0.00E+00 |
| 184 | 2.63E-02 | 9.53E-03 | 0.00E+00 |
| 185 | 2.27E-02 | 8.21E-03 | 0.00E+00 |
| 186 | 1.96E-02 | 7.09E-03 | 0.00E+00 |
| 187 | 1.70E-02 | 6.14E-03 | 0.00E+00 |
| 188 | 1.48E-02 | 5.34E-03 | 0.00E+00 |
| 189 | 1.29E-02 | 4.68E-03 | 0.00E+00 |
| 190 | 1.14E-02 | 4.10E-03 | 0.00E+00 |

FIG. 46

SYSTEM AND METHOD TO ACCOMPLISH HIGH-ACCURACY MIXING

CROSS REFERENCE TO RELATED APPLICATIONS

This Application claims priority to Provisional Application Ser. No. 60/251,673, entitled System to Accomplish High Accuracy Color Mixing, filed Dec. 6, 2000.

FIELD OF INVENTION

This invention relates generally to systems and methods for determining proper combinations or mixtures.

BACKGROUND OF THE INVENTION

In many situations, it is necessary or desirable to combine or mix several substances or sources (e.g. of color or light), for instance, in order to obtain a desired color. Other properties may also need to be controlled or maintained within a desired range. Examples involving sources of color include the manufacture of fluorescent lamps for active matrix liquid crystal displays (AMLCD) for avionics applications, and tuning/specification of backlight color for various display applications such as light emitting diode (LED), organic light emitting diode (OLED), and cathode ray tubes (CRTs). Specifically, manufacture of fluorescent lamps for AMLCD avionics applications, as an example, may require tight control of lamp color within a desired range in order to maintain control of the optical output specifications. Color ranges or tolerances as low as plus or minus 0.005 in u' v' chroma or chromaticity coordinates (unitless parameters) for such applications are not uncommon. Fluorescent lamps typically require three phosphors (red/green/blue) blended together to coat the inside of the glass tube to meet the required color target. This blended slurry or mix of phosphors is typically excited through plasma in order to produce a white output. In the past, in the lamp industry, this blending or obtaining a desired mixture has generally been done empirically and required an experienced person with knowledge of both optics and phosphors. It typically took several iterations to meet the tight color tolerances or desired ranges of an avionics application.

SUMMARY OF THE INVENTION

It is one object and feature of the present invention to provide a system and method for determining the proper mixture of substances or sources, for instance, to obtain a desired color or chromaticity. Other objects and features of the present invention are that it be highly accurate and precise, that it be easy to use, and that it require only readily available hardware and software. In addition, it is an object of the present invention that some embodiments be suitable to allow a lamp manufacturer with little or no knowledge of optics to quickly and easily select quantities of phosphors for the manufacture of fluorescent lamps for AMLCD avionics applications.

In at least partial fulfillment of these objects, the present invention provides a system and method to accomplish, as an example, high-accuracy color mixing or combining sources of color. Specifically, the present invention provides a method for determining the proper mixture of substances or combination of sources (e.g. of light), for instance, to obtain a desired color. The method may comprise some or all of the steps of determining the desired chromaticity, determining the desired quantity of substances (e.g. phosphor mix) or light sources to be produced or used, calculating the proportion of each substance or source of light, and calculating the quantity of each substance or source of light that is required to meet the desired chromaticity and quantity of substance or source of light. The method may also comprise some or all of the steps of mixing the substances (e.g. mixing phosphors to produce a phosphor mix), preparing a prototype (either with the mix of substances or with the sources of light), measuring the chromaticity of the prototype, and determining if the chromaticity of the prototype is within the desired or required range. If the chromaticity is not within the desired or required range, the method typically further comprises the step of calculating any required adjustments in the quantities of substances (e.g. phosphors), light, or light sources. If the chromaticity is not within the desired or required range, the method may also further comprise the steps of mixing or adding the required adjustments of substances or light sources, preparing another prototype, and measuring the chromaticity of the prototype. This process may be repeated until the desired or required chromaticity is achieved. Once the chromaticity is within the desired or required range, the method may comprise the step of using the mix of substances or light sources to manufacture products. Other properties besides chromaticity, may need to be held within a desired range by controlling their proportion in a combination or mixture.

In specific embodiments, the present invention provides a method of obtaining a desired mixture of substances. The substances are generally mixed in a (e.g., predetermined) proportion, and the desired mixture will typically have at least one property that is influenced by the proportion of the substances in the desired mixture. The desired mixture may have a desired range for the property. The method may comprise the steps of: mixing the substances to form a working mixture; preparing a prototype with the working mixture; measuring the property of the prototype; comparing the property of the prototype with the desired range; calculating an adjustment in the proportion of the substances; and repeating these steps until the property of the prototype is within the desired range. The calculating step may involve using a computer, and a spreadsheet program may be used. The calculating may involve dividing the property into component bands and performing calculations, which may be iterative calculations, on each band.

The present invention also provides a method for determining a proper combination for obtaining a color within a desired range. This embodiment typically includes the steps of: calculating quantities of sources of color; combining the sources of color; preparing a prototype; measuring the chromaticity of the prototype; determining if the chromaticity of the prototype is within the desired range; and repeating these steps until the chromaticity of the prototype is within the desired range. The prototype may have three sources of color.

The present invention also provides, a computer implemented method for determining a proper mixture of phosphors for manufacturing florescent lamps that produce a chromaticity within a desired range. This embodiment typically includes the steps of calculating the proportion of each phosphor to obtain the desired chromaticity; mixing the phosphors to form a first working mixture; and preparing a first prototype using the first working mixture. It typically also includes measuring the chromaticity of the first prototype; and calculating a first adjustment in phosphor quantities. This embodiment generally also includes the steps of adding the first adjustment in phosphor quantities to the first working mixture to form a second working mixture; preparing a second prototype using the second working mixture; and measuring the chromaticity of the second prototype. The calculations may utilize hard coded values specifically determined for the phosphors being used, and may involve tristimulus values. The computer may further be used to calculate additional adjustments in phosphor quantities and additional prototypes may be made and measured.

The present invention also provides, in an exemplary embodiment, a computer program, specifically a spreadsheet, specifically a spreadsheet prepared for MICROSOFT EXCEL, which can accurately and easily be used to perform the step of calculating any required adjustments in the quantities of substances (e.g. phosphors) or light sources. The spreadsheet provided is specifically configured, as an example, to calculate adjustments in phosphor quantities required for manufacturing lamps for backlighting in avionics applications, specifically fluorescent lamps for AMLCD avionics applications. Use of the spreadsheet described includes the steps of inputting the measured chromaticity, the desired chromaticity, and starting phosphor weights for a prototype, pressing "Normalize" and "Calculate Adjustment" buttons, and reading the recommended adjustment. The spreadsheet performs various calculations in which it divides the chromaticity into component wavelength bands, each band two nanometers (nm) wide, and performs iterative calculations. The first "Normalize" iterative routine forces convergence between the initial weighted chromaticity and the measured chromaticity. The second "Calculate Adjustment" iterative routine forces convergence between the measured chromaticity and the target chromaticity. The resulting output is the mass in grams of each phosphor to be added to the mix of phosphors to obtain the desired chromaticity from the product or lamp.

BRIEF DESCRIPTION OF THE DRAWINGS

The present invention is illustrated by way of example and not limitation in the accompanying figures, in which like reference numbers indicate similar elements, and in which:

FIGS. 3–18 are a printout showing the numerical values of a spreadsheet, which illustrates an exemplary embodiment of the present invention; and FIGS. 19–46 are a printout showing the formulas for some of the cells of the spreadsheet depicted in FIGS. 3–18, which illustrates an exemplary embodiment of the present invention.

DETAILED DESCRIPTION

Figure 1:
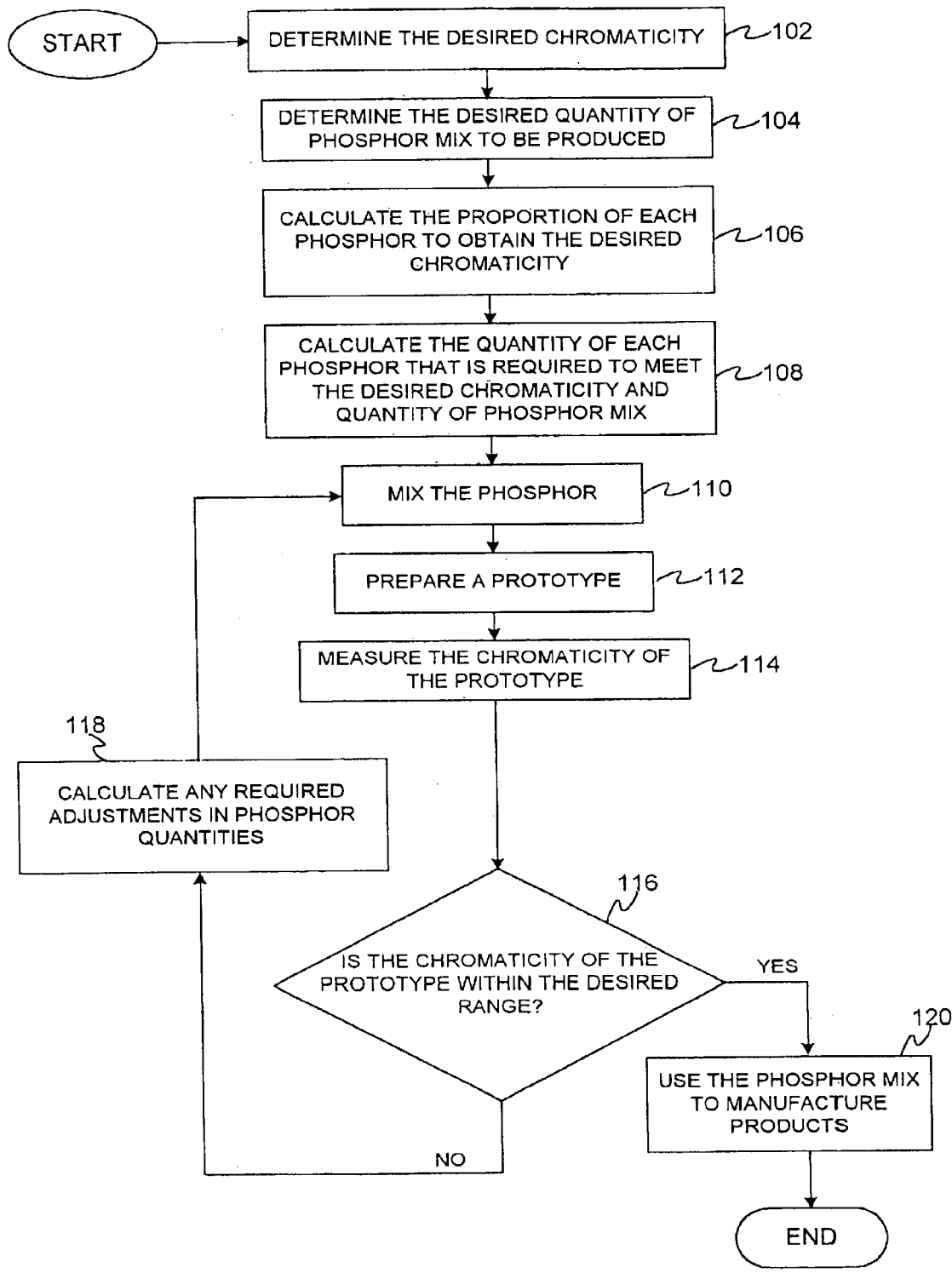
FIG. 1 is a flow chart illustrating the steps to perform high-accuracy color mixing.

Systems and methods in accordance with various aspects of the present invention provide an improved way to accomplish mixing of substances or sources of light or color. In this regard, the present invention may be described herein in terms of functional block components and various processing steps. It should be appreciated that such functional blocks may be realized by any number of hardware, firmware, and/or software components configured to perform the specified functions. For example, the present invention may employ various integrated circuit components, such as memory elements, digital signal processing elements, look-up tables, databases, and the like, which may carry out a variety of functions under the control of one or more microprocessors or other control devices. Such general techniques and components that are known to those skilled in the art are not described in detail herein.

It should further be understood that the exemplary process illustrated may include more or less steps or may be performed in the context of a larger processing scheme. Furthermore, the various flowcharts presented in the drawing figures are not to be construed as limiting the order in which the individual process steps may be performed.

As a general overview, the present invention provides a system and method for determining the proper mixture of substances (e.g. phosphors) or sources (e.g. of light) to obtain a required or desired mixture property (e.g. color or chromaticity). Referring to FIG. 1, steps may include mixing the substances or sources (e.g. step 110), preparing a prototype (e.g. step 112), measuring the property (e.g. chromaticity) of the prototype (e.g. step 114), and calculating any required adjustments in the quantities of substances or sources (e.g. step 118). This process may be repeated until the desired property (e.g. chromaticity) is achieved, after which the mix of substances or sources may be used to manufacture products (e.g. step 120). This invention also provides a computer spreadsheet in MICROSOFT EXCEL (e.g. FIGS. 3–46), which generally calculates (e.g. step 118) any required adjustments in the quantities of substances or sources. As an exemplary embodiment, the spreadsheet provided is specifically configured to calculate adjustments in phosphor quantities required for manufacturing lamps for backlighting in AMLCD avionics applications. The measured chromaticity, desired chromaticity, and starting prototype phosphor mass or weights are input (e.g. step 202 shown in FIG. 2). The spreadsheet performs various calculations in which it divides the chromaticity into component wavelength bands and performs iterative calculations. Convergence is first forced between the initial weighted chromaticity and the measured chromaticity (e.g. step 206). Then convergence is forced between the measured chromaticity and the target chromaticity (e.g. step 208). The resulting output is the mass in grams of each phosphor to be added to the mix of phosphors to obtain the desired chromaticity from the product or lamp (e.g. step 210).

Describing specific embodiments in more detail and referring generally to FIG. 1, the present invention may provide a method of obtaining a desired mixture of two, three, or more substances. The substances are generally mixed in a (prespecified) proportion, and the desired mixture will typically have at least one property (e.g. color or chromaticity) that is influenced by the proportion of the substances in the desired mixture. The desired mixture may have a desired range for the property (e.g. chromaticity). In an exemplary embodiment, the method comprises the steps of: mixing the substances to form a working mixture (e.g. step 110); preparing a prototype with the working mixture (e.g. step 112); measuring the property of the prototype (e.g. step 114); comparing the property of the prototype with the desired range (e.g. step 116); calculating adjustments in the proportion of the substances (e.g. step 118); and repeating these steps (e.g. steps 110, 112, 114, 116, and 118) until the property of the prototype is within the desired range.

The property (e.g. chromaticity) may comprise, for instance, two coordinates, and each coordinate may be influenced by the proportion of the substances. In such embodiments, the desired range may include a range or subrange (desired subrange) for each coordinate. For instance the property may be color; and the coordinates may be chromaticity coordinates.

The calculating step (e.g. step 118) may involve using a computer or processor, and a spreadsheet program (e.g. as shown in FIGS. 3–46) may be used. The calculating step (e.g. step 118) may involve dividing the property into component bands (e.g. wavelength bands), may include the performance of calculations on each band, and may also involve performing iterative calculations. In many embodiments, the desired range will include a target or ideal value for the property. In such embodiments, the step of calculating (e.g. step 118) may involve forcing convergence between the measured property and the target. Many embodiments include determining quantities of the substances to add to the working mixture (e.g. in step 118), adding the quantities to the working mixture (e.g. in step 110), and mixing the substances (e.g. step 110) to form a slightly different (typically improved) working mixture (e.g. to be used to prepare a new prototype in step 112).

Still referring to FIG. 1, the present invention also provides a method for determining a proper combination for obtaining a color within a desired range. This second major exemplary embodiment typically includes the steps of: calculating quantities of sources of color (e.g. step 108); combining the sources of color (e.g. step 110); preparing a prototype (e.g. step 112); measuring the chromaticity of the prototype (e.g. step 114); determining if the chromaticity of the prototype (e.g. a lamp) is within the desired range (e.g. step 116); and repeating the above steps (e.g. steps 118, 110, 112, 114, and 116) until the chromaticity of the prototype is within the desired range. The prototype may have three sources of color (e.g. phosphors or different colored LEDs).

Again, the calculating steps (e.g. steps 108 and 118) may involve using a computer or processor, possibly with a spreadsheet program, and may include the step (e.g. step 120) of manufacturing liquid crystal displays or lamps for backlighting in various applications including avionics applications. The calculating step (e.g. step 118) may involve determining an adjustment of the sources of color (e.g. a quantity of one or more phosphor) and adding the adjustment to the (previously combined) quantities of the sources of color (e.g. phosphors). The step of calculating (e.g. step 118) in this exemplary embodiment may also comprise dividing the chromaticity into component wavelength bands, which each may all be substantially the same width, and may be at least one nanometer wide and no more than 3 nanometers wide. The step of calculating (e.g. step 118) in this exemplary embodiment may involve performing iterative calculations, and may utilize the technique of forcing convergence between the measured property and the target.

As described elsewhere herein, in the exemplary embodiment illustrated, the wavelength bands are all two nanometers wide.

Taking an even more detailed look at the present invention and how it may be used in various exemplary embodiments, FIG. 1 is a flow chart illustrating a method to achieve the steps of one embodiment of the present invention for color mixing. For purposes of example, FIG. 1 refers to phosphors, e.g. for the manufacture of fluorescent lamps. However, the present invention could also be used for mixing other substances, sources of light, etc. For instance, although avionics instrumentation is often backlighted with fluorescent lamps, e.g. serpentine or bent fluorescent lamps, many (e.g. hundreds of) red, green, and blue LEDs could also be used and the light produced blended to produce the right overall color or chromaticity. In such a situation the present invention could be used to select the right mix of the three color LEDs. The red, green, and blue spectra characteristics of the LEDs would be input (rather than mass of phosphors), and the output would be the number of each color LED to add or use. Another application would be to select phosphors for cathode ray tubes (CRTs). Other applications extend beyond avionics applications.

Reviewing the steps shown in FIG. 1, for the example of phosphors for lamps, the first two steps illustrated are to determine the desired chromaticity (step 102) and to determine the desired quantity of phosphor mix that is needed (step 104). The desired chromaticity (for step 102) may be a range specified for the product to be manufactured, for example, for the manufacture of fluorescent lamps for AMLCD avionics applications. The quantity of phosphor (e.g. in step 104) may be specified, for instance, in mass or volume. Determining the desired chromaticity and determining the desired quantity of phosphor mix to be produced (steps 102 and 104 respectively) may be accomplished in either order depending on the circumstances at hand. The quantity of phosphor mix (for step 104) will typically depend on the number of products to be manufactured (e.g. number of lamps), the quantity of phosphor mix required for each product, the amount of phosphor mix that is typically wasted when a product is manufactured, etc. The steps may be similar for other substances besides phosphors.

Once the desired chromaticity is determined (step 102), the proportion of each substance (e.g. phosphor) may be calculated or determined (step 106) using methods known in the art. Such methods may include simply using the same proportions that were used successfully in a previous batch for a similar application. Determining the desired quantity of phosphor mix to be produced (step 104) and calculating the proportion of each phosphor to obtain the desired chromaticity (step 106) could usually be completed in either order as long as determining the desired chromaticity (step 102) is completed before calculating the proportion of each phosphor to obtain the desired chromaticity (step 106). Once the proportion of each phosphor is determined (step 106), and the quantity of phosphor mix is determined (step 104), the quantity of each phosphor, generally in mass or volume, may be calculated (step 108). Then these quantities of phosphors or other substances are mixed (step 110). In other words, the phosphors are mixed in some proportion forming a working mixture. A prototype product (e.g. a lamp) may then be manufactured (step 112) using this working mixture. As used herein, the term prototype means that it is one of the first products made with this working mixture or batch of substance, e.g. phosphor mix, and is used to determine, as a minimum, if the batch is acceptable. The chromaticity of the prototype is then measured (step 114), for example with a calorimeter, and compared (in decision step 116) with the desired or required range for the product (e.g. from step 102). It may be necessary or desirable to put the prototype through a process to simulate aging prior to measuring the chromaticity.

If the chromaticity of the prototype is within the desired or required range (as determined in decision step 116) then the phosphor mix may be used to manufacture (e.g. many) copies of the product (e.g. many lamps for AMLCD avionics applications) (step 120), which all presumably have approximately the same chromaticity as the prototype (e.g. of step 112). However, in applications where a precise chromaticity is required, for example, the manufacture of fluorescent lamps for AMLCD avionics applications, the chromaticity of the first iteration prototype is typically not within the required range. If (as determined in decision step 116) the chromaticity is not within the desired or required range, then required adjustments to the quantities of phosphors are calculated (step 118). Adjustments to the quantities of phosphors (in step 118) may be calculated with a computer, for instance a spreadsheet, an exemplary embodiment of which is described herein. Once the adjustment quantities are calculated (in step 118), the adjustment quantities may be added to the original mix and mixed together (repeating step 110), another prototype may be manufactured (step 112) and the chromaticity of the new prototype may be measured (step 114). In many applications the chromaticity will then be within the desired range (as determined in decision step 116), and the phosphor mix will be used to manufacture more products (e.g. lamps) (step 120). However, if, on the other hand, the chromaticity is still not within the desired range (as found in decision step 116), another iteration of adjustments to the phosphor quantities may be calculated (step 118). This process (steps 118, 110, 112, 114, and 116) may be repeated as many times as required to obtain the desired chromaticity; however, typically few such iterations are required.

This sequence of steps just described is in contrast to the prior art wherein, rather than performing calculations, a skilled artisan typically intuitively or empirically determined adjustments to the phosphor quantities. The present invention typically requires fewer iterations, the preparation and chromaticity testing of fewer costly prototypes, and less skill on the part of the user.

Shifting the focus to FIGS. 2–46, the present invention also provides, included herein as an exemplary embodiment, a software tool for calculating the required adjustments in phosphor quantities (step 118) in FIG. 1. In addition to other potential applications, this software tool may allow a lamp (or other product) manufacturer with little or no knowledge of optics to input parameters (described below) essential to color mixing of 3-phosphor lamps in order to meet the specified color target. These inputs may first be used to calibrate the software tool (in order to take into account variations in the overall system, including calorimeter used to measure the color), and then to obtain the offset necessary in the relative RGB phosphor weightings in order to meet the desired color.

The tool may be run on or be programmed into a computer, such as a PC, typically with a spreadsheet or spreadsheet software such as MICROSOFT EXCEL preferably with a SOLVER add-on. There typically will be hard-coded values, e.g. for phosphor spectra (or the analogous equivalent for other technology), tristimulus values (necessary to transform spectra into chromaticity coordinates), and formulas to accomplish the conversion. The user may have buttons to accomplish first normalization and then adjustment calculations. Such a spreadsheet is described herein as an exemplary embodiment of the present invention.

In general, the software tool may use four inputs which are typically entered into the spreadsheet before operation of the tool, not necessarily in the order that they are described herein. First, the software tool may have input spectral characteristics of tri-color emitting elements, e.g. a 3-color phosphor mix, which for example, may be in a 2 nm resolution from 400 nm to 700 nm. Second, the software tool may have input the absolute weightings of tri-color elements (e.g. gram mass of phosphor or number of elements in case of an LED) or relative weightings e.g. of each phosphor, to the desired resolution (e.g. to the nearest 1 gram). The relative weightings typically sum to 100%. Third, the software tool may have input a measured emission chromaticity for a 1st iteration (prototype) lamp, typically in u' v' coordinates (e.g. to a 0.001 resolution) (unitless). Fourth, the software tool may have input a target emission chromaticity, again typically in u' v' coordinates (e.g. to a 0.001 resolution). Both the measured and target chromaticities should preferably be achieved or evaluated in the final product (e.g. the fluorescent lamp backlight, LED array, etc.) under the common environmental and electronic drive conditions. The tool may incorporate the spectral inputs of each phosphor with the relative weightings of each phosphor to obtain a calculated color target, which may then be normalized to what is input as the measured chromaticity (this normalization takes into account errors introduced by the measuring instrument, for example). The tool then may allow the user to calculate the adjustment in amounts of each phosphor necessary to move the 3-color mixture from the measured color to the target color. The tool may use iteration to calculate the normalized values and adjustments. Convergence criteria for the iterative calculations may be 0.001%. The convergence metric is typically u' v' chromaticity coordinates, and the conditions for convergence may be tested after each calculation by convolution of the tri-color weightings with the spectral content of each element and subsequent conversion of the spectral output to u' v' chromaticity coordinates by means of the known values of tristimulus values X-bar, Y-bar, and Z-bar.

Figure 2:
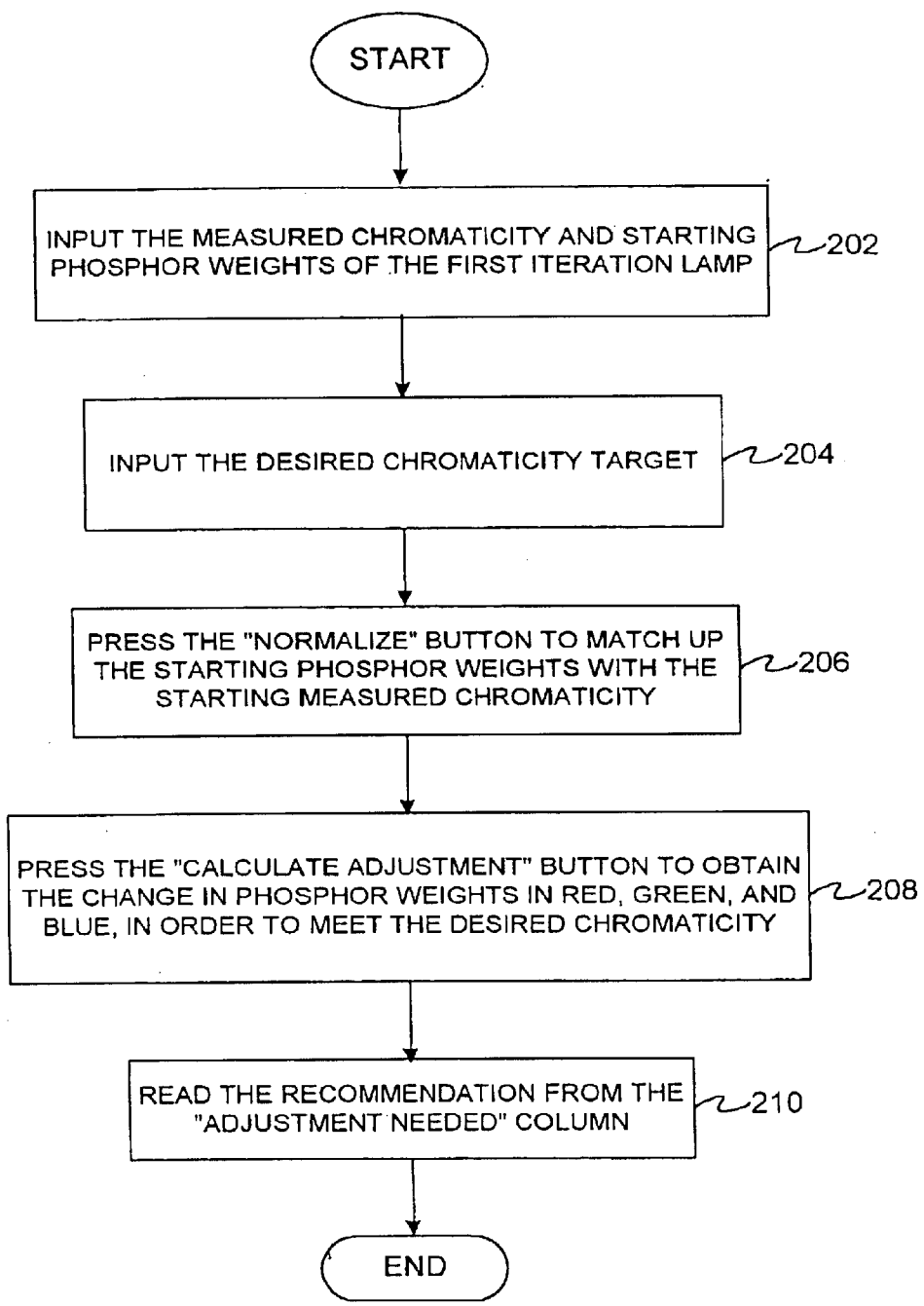
FIG. 2 is a flow chart illustrating the steps to use one spreadsheet embodiment of the present invention to calculate adjustments to the quantities of phosphors.
Figure 4:
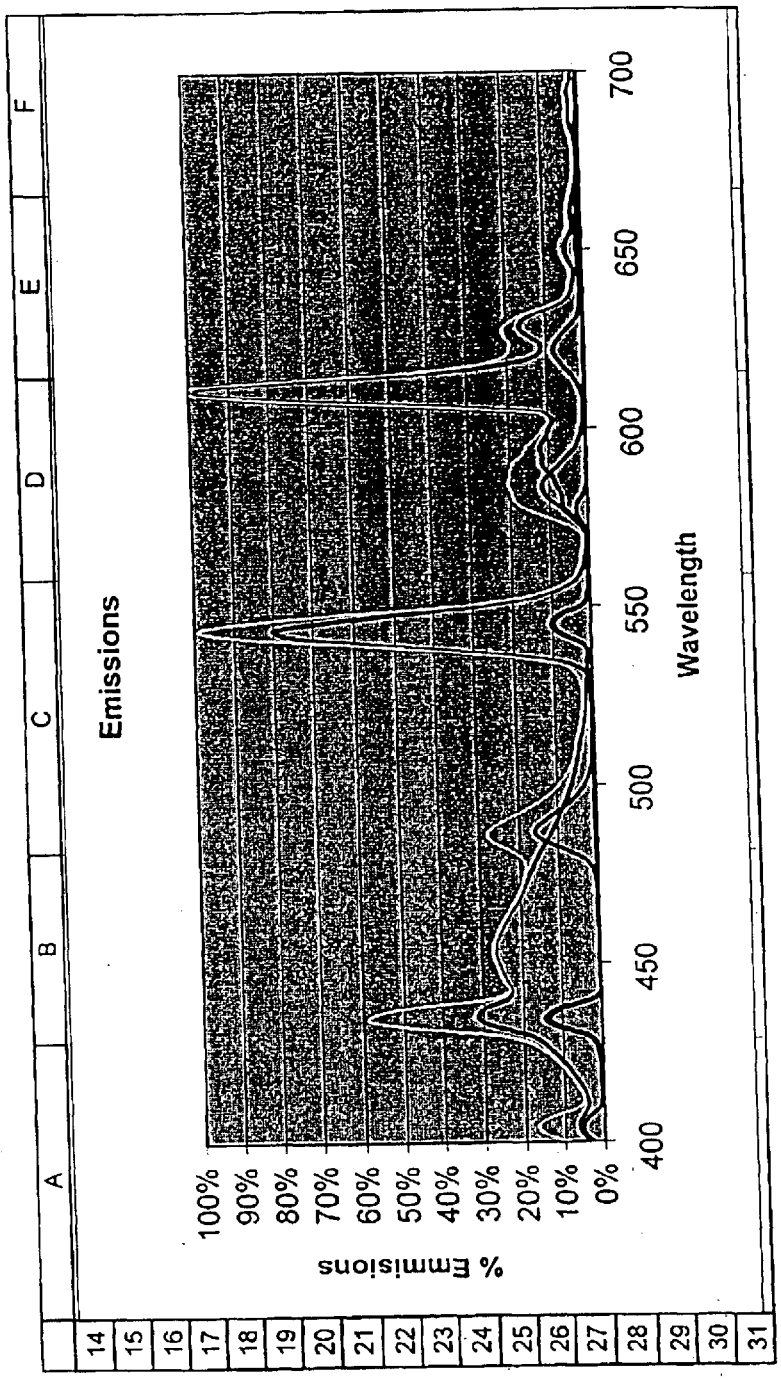
Figure 5:
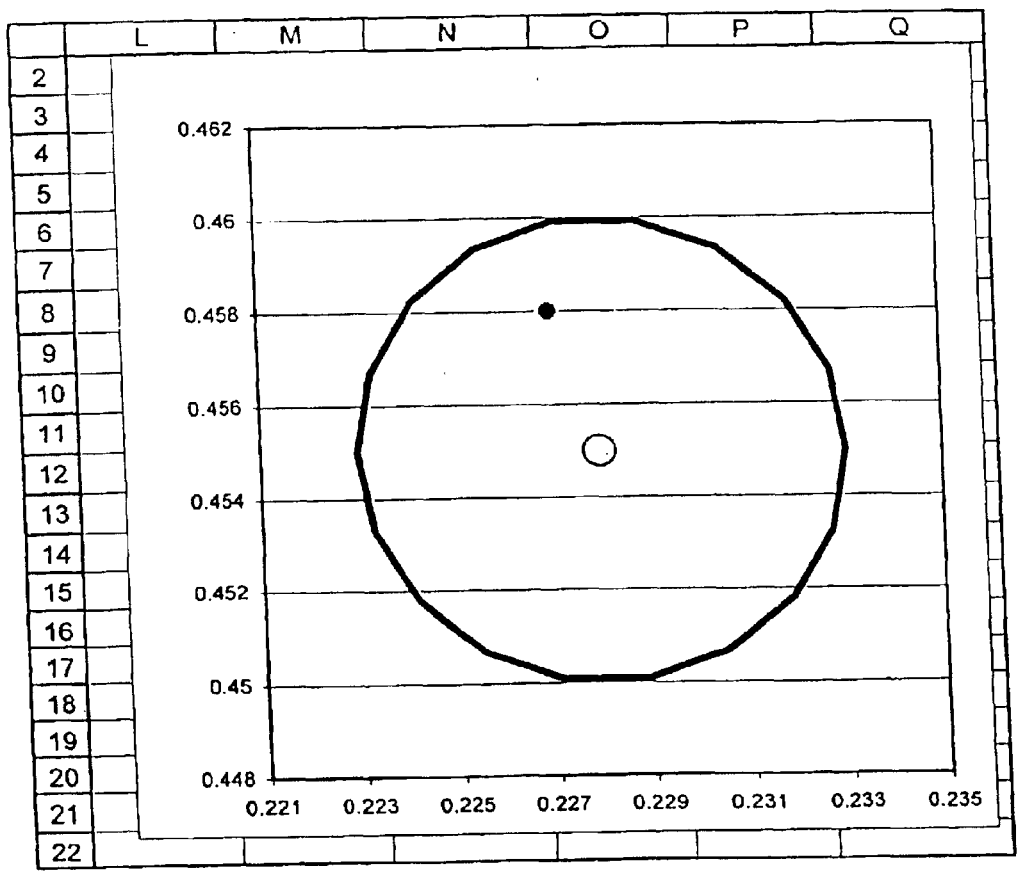

FIG. 2 is a flow chart illustrating the steps to use the exemplary method for generating a spreadsheet embodiment of the present invention for one iteration, for example, for manufacturing lamps. In further description of the exemplary embodiment spreadsheet, FIGS. 3–18 is a screen shot or printout showing some of the numerical values of the exemplary embodiment spreadsheet. Illustrated is essentially what a user would see utilizing the booster tool within EXCEL. However, the user would also see two buttons in the lower right corner; one that allows normalization of the tool, and the other that allows calculation of the tools. These buttons are both tied to macros, which are described in detail below. FIGS. 3–18 can be assembled with FIG. 3 in the upper left, FIG. 4 below FIG. 3, FIG. 5 to the right of FIG. 3, FIGS. 6–12 in order below FIG. 4, and FIGS. 13–18 in order to the right of FIGS. 6–12. FIGS. 3–18 show entered or calculated values for each cell for one example of entered data. FIGS. 4 and 5 show graphs.

FIGS. 19–46 is a printout showing the formulas for some of the cells of the spreadsheet depicted in FIGS. 3–18, which illustrates an exemplary embodiment of the present invention. FIGS. 19–46 can be assembled with FIG. 19 in the upper left, FIG. 20 to the right of FIG. 19, and FIG. 21 further to the right. FIG. 22 lies below FIG. 19, FIG. 23 below FIG. 22, FIG. 24 below FIG. 23, FIG. 25 below FIG. 24, FIG. 26 below FIG. 25, FIG. 27 below FIG. 26, and FIG. 28 below FIG. 27. FIG. 29 is properly located to the right of FIG. 22, FIG. 30 below FIG. 29, FIG. 31 below FIG. 30, FIG. 32 below FIG. 31, FIG. 33 below FIG. 32, and FIG. 34 below FIG. 33. FIG. 35 is properly located to the right of FIG. 29, FIG. 36 below FIG. 35, FIG. 37 below FIG. 36, FIG. 38 below FIG. 37, FIG. 39 below FIG. 38, and FIG. 40 below FIG. 39. FIG. 41 is located to the right of FIG. 35, with FIG. 42 below FIG. 41, FIG. 43 below FIG. 42, FIG. 44 below FIG. 43, FIG. 45 below FIG. 44, and FIG. 46 below FIG. 45. These figures together show the entire spreadsheet and show either formulas or entered or calculated values for each cell of the spreadsheet.

Referring once again to FIG. 2, in the exemplary embodiment, the measured chromaticity and starting phosphor weights of the first iteration prototype, (e.g. a lamp) are input (step 202). This is essentially the chromaticity measurement of step 114 and the data calculated in step 108, both shown in FIG. 1. The measured chromaticity u' and v' is entered in cells C12 and D12 respectively as shown in FIGS. 3 and 19. The starting phosphor weights or starting formulation is entered into cells F5, F6, and F7 for the red, green, and blue phosphors respectively, also as shown in FIGS. 3 and 19. Step 204 is to input the desired color or chromaticity target u' and v', for the product, which is entered into cells FIGS. 3 and 19. These values are essentially the desired chromaticity from step 102 of FIG. 1. The desired chromaticity, for example, may be a particular hue of white or a white color point. In an exemplary embodiment of the present invention, the cells that receive input data (e.g. cells C12, D12, F5, F6, F7, C13, and D13) are white (not shaded) on the spreadsheet to indicate to the user that input data is required in these cells. Step 206 is to press the "normalize" button (one of the buttons described above as being in the lower right corner) to match up the starting phosphor weights or mass (cells F5, F6, and F7) with the starting measured chromaticity (cells C12 and D12). Among other things, the "normalize" function compensates for, or takes into account, any variation in instrumentation used to measure the chromaticity. Step 208 is to press the "calculate adjustment" button (the other button described above as being in the lower right corner) to obtain the change in phosphor weights in red, green, and blue, in order to meet the desired chromaticity. The recommended change in phosphor weights or adjustment needed appears in cells D5, D6, and D7 as shown in FIGS. 3 and 19. The recommended changes in phosphor weights in step 210 are essentially the required adjustments in phosphor quantities in step 118 on FIG. 1. Step 210 is to read the recommendation from the "adjustment needed" column (cells D5, D6, and D7) for the red, green, and blue phosphors (respectively). The mass or number of grams of each phosphor to be added is indicated in the exemplary embodiment, although other ways of indicating the relative amounts of the phosphors could also be used.

Focusing now within the exemplary embodiment spreadsheet and referring to FIGS. 6–11, and 22–27, the cells in column D from rows 40 to 190 indicate a wavelength for each corresponding row (40 to 190). These wavelengths start at 400 nm in row 40, and increase by 2 nm per row to 700 nm in row 190. Thus, each row from 40 to 190 corresponds to a band of wavelengths, each band being 2 nm in width. Thus, the spreadsheet performs calculations for each 2 nm band of wavelengths, and weighting is typically applied equally to all bands of wavelengths within the range (e.g. from 400–700 nm) for each color element. Other widths of wavelength bands could be used, for instance 1 or 3 nanometers wide, or something in-between.

Each phosphor typically has a known spectral characteristic that has been hard coded or entered into the spreadsheet. Thus, for each wavelength or range of wavelengths in column D, corresponding characteristics or properties of the particular red, green, and blue phosphors are hard coded in columns E, F, and G, respectively, rows 40 through 190, as shown in FIGS. 6–11, and 22–27. These hard coded values are typically unique to the phosphor materials being used or the analogous equivalents for other technology. In the exemplary embodiment of manufacturing lamps using phosphors, these values can be determined by constructing a lamp with just the red phosphor, constructing a lamp with just the blue phosphor, and constructing a lamp with just the green phosphor. Chromaticity measurements from each of these single-phosphor lamps can be used to determine the values input into columns E, F, and G, respectively, rows 40 through 190. However, such a process typically only need be performed once for each phosphor, regardless of how many batches of mix (working mixtures) are made with them thereafter.

Columns A, B, and C, rows 40 through 190 as shown in FIGS. 6–11, and 22–27 contain what is labeled "Lamp Color Calculation" (see the label in row 36). These calculated values (shown e.g. in FIG. 3) correspond to the wavelengths or wavelength bands indicated in column D, and are intermediate values calculated with the formulas shown, for example, in FIGS. 22–27, rows 40 through 190. The calculated values in columns A, B, and C, rows 40 through 190 will be discussed in more detail below after other values are introduced.

Columns H, I, J and K, rows 40 through 190 as shown in FIGS. 13–18, and 29–34 contain what are labeled "Spectral Emissions of Mixture" (see the label in row 36). These calculated values (shown e.g. in FIG. 13) also correspond to the wavelengths indicated in column D, and are calculated with the formulas shown, for example, in FIGS. 29–34, rows 40 through 190. The red, green, and blue values in columns H, I, and J, are simply the properties of the phosphors from columns E, F, and G, multiplied by the formulation percent (proportion of each phosphor from step 106 in FIG. 1) in column E rows 5 through 7. The white values in column K are simply the sum of the values in columns H, I, and J.

Still referring to FIGS. 13–18, and 29–34, columns M, N, O, and P, rows 40 through 190 contain what are labeled "Spectral Emissions for Graph Normalized" (see the label in rows 36 and 37). These calculated values (shown e.g. in FIG. 13) also correspond to the wavelengths indicated in column D (and identically indicated in column L), and are calculated with the formulas shown, for example, in FIGS. 29–34, rows 40 through 190. The red, green, blue, and white values (not labeled as such) in columns M through P are simply the "Spectral Emissions of Mixture" values from columns H through K, divided by the maximum value found in columns H through K, rows 40 through 190. Thus, the largest value in columns M through P and rows 40 through 190 is one (1). The white values in column K are simply the sum of the values in columns H, I, and J.

As shown in FIGS. 41–46, columns Q, R, and S, rows 40 through 190 contain tristimulus values, which are labeled "X-BAR", "Y-BAR", and "Z-BAR" (see the labels in row 36, FIG. 41). The tristimulus values are hard coded values which are spectral representations of the three primary colors (red, green, and blue) used to convert spectra to chromaticity coordinates u' and v'. Thus, in cells A40 through S190, the tool or spreadsheet is working strictly in spectra. However, the values "X-BAR", "Y-BAR", and "Z-BAR", are used (and are well known in the art) to convert from spectra content to the u' v' chromaticity space.

Returning once again to the "Lamp Color Calculation" values in columns A, B, and C, rows 40 through 190, as shown, for example, in FIGS. 3 and 19, these values are the tristimulus values "X-BAR", "Y-BAR", and "Z-BAR" (respectively) in columns Q, R, and S, rows 40 through 190, multiplied by the white "Spectral Emissions of Mixture" in column K, same rows. See the formulas shown, for example, in FIGS. 22–27, rows 40 through 190. Turning now to FIGS. 12 and 28, the "Lamp Color Calculation" values in columns A, B, and C, rows 40 through 190 are summed for each column, and multiplied by two, in row 192, cells A192, B192, and C192. See the formulas in these cells in FIG. 28. These values are then transcribed into cells B195, B196, and B197 for X, Y, and Z respectively. Then x and y are calculated in cells B199 and B200 respectively, with the formulas shown in FIG. 28, namely, x being $X/(X+Y+Z)$ and y being $Y/(X+Y+Z)$. From these values, values of u' and v' are calculated in cells B202 and B203 respectively with the formulas shown in FIG. 28, namely, u' being $4x(3+12y-2x)$ and v' being 9y(3+12y−2x). For reference and completeness, the luminance or resultant brightness of the tri-color mixture, L, is also calculated in cell B205, based on the calculated chromaticity. Specifically, L=Y(683)(0.2919).

Cells B5 through C7, shown in FIGS. 3 and 19, are essentially storage cells for the "Normalize" calculation, during which the original phosphor mass or weights and the spectral content is convolved with the tristimulus values to calculate what the chromaticity "should be". These weights are stored (in essence temporarily, as they are not used after the convergence between the calculated and measured chromaticity is achieved) and not used again. As mentioned above, although not shown on the figures, the tool typically has "Normalize" and "Calculate Adjustment" buttons immediately below the graph of the chroma specification (roughly in the vicinity of cells I23 and I26), which are programmed to execute the optimization/convergence calculations described herein.

The "Normalize" button initiates and performs an iterative calculation intended to bring the corresponding chromaticity (u' v') of the relative weightings of the tri-color elements into synch with the measured chromaticity of the backlight. This button initiates the following iterative calculation. First, the relative weightings of each color element are parameterized. Then SOLVER runs an optimization routine on the parameterized color weightings to force convergence between the initial weighted chromaticity (based on initial weights and spectral content) and the measured chromaticity. The initial element weights are changed until convergence with the measured chromaticity input is achieved, and then the calculated weights are stored in the spreadsheet as the starting point for the "Calculate Adjustment" calculation.

The "Calculate Adjustment" button initiates and performs an iterative calculation intended to force convergence of the measured chromaticity with the input target chromaticity. This button initiates the following iterative calculation. First, relative weightings of each color element are parameterized. Second, SOLVER runs an optimization routine on the parameterized color weightings to force convergence between the measured chromaticity and the target chromaticity. The element weights are changed until convergence with the target chromaticity is achieved. Then finally, the differences between the starting and ending weights for each of the color elements are calculated and displayed on the spreadsheet (e.g. as the "Adjustment Needed" in cells C5 through C7).

When either the "Normalize" or "Calculate Adjustment" buttons are used, SOLVER optimization occurs under the following simultaneously-applied constraints. First, the sum of the tri-color element weightings is minimized (to prevent the additions to each color from increasing without bound). Second, the initial weights for each element are set as minimum constraints (to prevent the final weight for any element form being less than the initial weight, resulting in a recommendation to remove material, which may not be physically possible). Third, the convergence criteria between the starting and ending chromaticity values occurs with 0.001 resolution in u' v' coordinates. In other words, iterations are performed until the convergence criteria (initial and final chroma values are within 0.001%) is achieved. The SOLVER optimization is run when either the "Normalize" or "Calculate Adjustment" buttons are used, the only difference being the initial and final chromaticities. The "Normalize" button designates the "Calc Lamp chroma target" (cells C11 and D11, which contain the same values as cells B202 and B203 respectively) as the initial, and the "Lamp Measurement" (cells C12 and D12) input values as the final target. In contrast, the "Calculate Adjustment" button designates the "Lamp Measurement" (cells C12 and D12) input values as the initial target, and the "Desired chromaticity" (cells C13 and D13) input values, as the final target.

The information between cells R5 and X31 generates the graphics shown best on FIGS. 4 and 5. The formulas used to generate the graph shown in FIG. 5 can be seen primarily on FIG. 20. This information graphs the target chromaticity (u' v' coordinates, represented by cells U5 and U6) and specification circle radius (cell U7, typically predefined, e.g. for various avionics requirements). Referring to FIG. 5, the white dot in the center represents the ideal chromaticity, the big circle represents the desired or required range of chromaticities, and the black dot represents the measured chromaticity, e.g. of the prototype. The graph on FIG. 4 shows the emissions as a function of wavelength, typically of both the measured and desired chromaticity.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention and are not intended to limit the scope of the invention. It is contemplated that the use of the present invention can involve components having different characteristics as long as the principle, the presentation of a system or method for accomplishing high-accuracy mixing, is followed.

What is claimed is:

1. A method of obtaining a desired mixture of at least two light sources, the light sources being mixed in a proportion, the desired mixture having at least one optical property that is influenced by the proportion of the light sources in the desired mixture, the desired mixture having a desired range for the optical property, the method comprising the steps of:

mixing the light sources to form a working mixture, each of the light sources having an initial weight and a spectral content;

preparing a prototype with the working mixture;

measuring the optical property of the prototype;

determining an initial weighted optical property of the working mixture based on the initial weights and spectral contents of the light sources;

adjusting the initial weights of the light sources until the initial weighted optical property of the working mixture converges with the measured optical property of the prototype;

comparing the optical property of the prototype with the desired range;

adjusting the proportion of the light sources until measured optical property of the prototypes converges within the desired range.

2. The method according to claim 1, the property comprising color.

3. The method according to claim 1, the desired mixture comprising at least three light sources.

4. The method according to claim 3: the property comprising at least two coordinates; each coordinate being influenced by the proportion of the light sources and the desired range having a desired subrange for each coordinate.

5. The method according to claim 4: the property comprising color; and the coordinates being chromaticity coordinates.

6. The method according to claim 1, said initial weights adjusting comprising using a computer, and said proportion adjusting comprising using a computer.

7. The method according to claim 6, said initial weights adjusting comprising using a spreadsheet program, and said proportion adjusting comprising using a spreadsheet program.

8. The method according to claim 6: said proportions adjusting comprising dividing the property into component bands; and calculating adjustments for each band.

9. The method according to claim 6, said initial weights adjusting comprising performing iterative calculations, and said proportions adjusting comprising performing iterative calculations.

10. The method according to claim 9: the desired range having a target; and said proportion adjusting comprising forcing convergence between the measured optical property and the target.

11. The method according to claim 1: said proportion adjusting comprising: determining quantities of the light sources to add to the working mixture; adding the quantities to the working mixture; and mixing the light sources to form a slightly different working mixture.

12. The method of claim 11: the property comprising color; the coordinates being chromaticity coordinates; said proportion adjusting comprising using: a personal computer, and a spreadsheet program; and the light sources being phosphors.

13. A method for determining a proper combination for obtaining a color within a desired range, the method comprising the steps of:
calculating quantities of phosphors, each of the phosphors having an initial weight and a spectral content;
combining the phosphors;
preparing a prototype;
measuring the chromaticity of the prototype;
determining an initial weighted chromaticity of the prototype based on the initial weights and spectral contents of the phosphors;
adjusting the initial weights of the phosphors until the initial weighted chromaticity of the prototype converses with the measured chromaticity of the prototype;
determining if the chromaticity of the prototype is within the desired range; and
adjusting the quantities of the phosphors until the measured chromaticity of the prototype converges within the desired range.

14. The method according to claim 13, the prototype comprising at least three phosphors.

15. The method according to claim 13, said quantities adjusting comprising using: a computer; and a spreadsheet program.

16. The method according to claim 13, the prototype being a lamp.

17. The method according to claim 16 further comprising the step of manufacturing liquid crystal displays.

18. The method according to claim 13: said quantities adjusting comprising: determining an adjustment of the phosphors; and said adding the adjustment to the calculated quantities of phosphors.

19. The method according to claim 18, further comprising the step of manufacturing lamps for backlighting in avionics applications.

20. The method according to claim 13, said quantities adjusting comprising dividing the measured chromaticity into component wavelength bands.

21. The method according to claim 20, the wavelength bands each being substantially the same width.

22. The method according to claim 21, the wavelength bands each being: at least one nanometer wide; and no more than 3 nanometers wide.

23. The method according to claim 13, said quantities adjusting comprising performing iterative calculations.

24. The method according to claim 23: the desired range having a target; and said quantities adjusting comprising forcing convergence between the measured chromaticity and the target.

25. A computer implemented method for determining a proper mixture of phosphors for manufacturing florescent lamps that produce a chromaticity within a desired range the method comprising the steps of:
calculating the proportion of each phosphor to obtain the desired chromaticity, each of the phosphors having an initial weight and a spectral content;
mixing the phosphors to form a first working mixture;
preparing a first prototype using the first working mixture;
measuring the chromaticity of the first prototype;
determining an initial weighted chromaticity of the first working mixture based on the initial weights and spectral contents of the phosphors;
adjusting the initial weights of the phosphors until the initial weighted chromaticity of the first working mixture converges with the measured chromaticity of the first prototype using a computer, calculating a first adjustment in phosphor quantities;
adding the first adjustment in phosphor quantities to the first working mixture to form a second working mixture;
preparing a second prototype using the second working mixture; and
measuring the chromaticity of the second prototype; and
adjusting the quantities of the phosphors until the measured chromaticity of the second prototype converses within the desired range.

26. The method according to claim 25, said calculating comprising: dividing the relevant spectrum into wavelength bends; and performing calculations on each wavelength bend.

27. The method according to claim 26, the calculations comprising hard coded values specifically for the phosphors being used.

28. The method according to claim 27, said hard coded values having been empirically determined by constructing a single-phosphor lamp with each substantially pure phosphor and measuring the chromaticity of each single phosphor lamp.

29. The method according to claim 25, said calculating comprising performing calculations using tristimulus values.

30. The method according to claim 25, said calculating comprising performing iterative calculations until convergence is achieved.

31. The method according to claim 25, further comprising the steps of:
using the computer, calculating a second adjustment in phosphor quantities;
adding the second adjustment in phosphor quantities to the second working mixture to form a third working mixture;
preparing a third prototype using the third working mixture; and
measuring the chromaticity of the third prototype.

32. The method according to claim 31, said calculating comprising:
dividing the relevant spectrum into at least ten wavelength bands and performing calculations on each wavelength band, the calculations comprising hard coded values unique to the phosphors being used;

performing calculations using tristimulus values; and performing iterative calculations until convergence is achieved.

33. The method according to claim 31 further comprising the step of manufacturing active matrix liquid crystal displays for avionics applications.

34. The method according to claim 31 further comprising the steps of:

using the computer, calculating a third adjustment in phosphor quantities;

adding the third adjustment in phosphor quantities to the third working mixture to form a fourth working mixture;

preparing a fourth prototype using the fourth working mixture; and measuring the chromaticity of the fourth prototype.

* * * * *